United States Patent
Gandham et al.

(10) Patent No.: US 10,873,593 B2
(45) Date of Patent: Dec. 22, 2020

(54) MECHANISM FOR IDENTIFYING DIFFERENCES BETWEEN NETWORK SNAPSHOTS

(71) Applicant: Cisco Technology, Inc., San Jose, CA (US)

(72) Inventors: Shashi Gandham, Fremont, CA (US); Navindra Yadav, Cupertino, CA (US); Janardhanan Radhakrishnan, Dublin, CA (US); Hoang-Nam Nguyen, San Jose, CA (US); Umesh Paul Mahindra, Cupertino, CA (US); Sunil Gupta, Milpitas, CA (US); Praneeth Vallem, San Jose, CA (US); Supreeth Rao, Cupertino, CA (US); Darshan Shrinath Purandare, Fremont, CA (US); Xuan Zou, Sunnyvale, CA (US); Joseph Daniel Beshay, Sunnyvale, CA (US); Jothi Prakash Prabakaran, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 207 days.

(21) Appl. No.: 15/992,071

(22) Filed: May 29, 2018

(65) Prior Publication Data
US 2019/0230112 A1    Jul. 25, 2019

Related U.S. Application Data

(60) Provisional application No. 62/622,019, filed on Jan. 25, 2018.

(51) Int. Cl.
*H04L 12/24* (2006.01)
*H04L 29/06* (2006.01)
(Continued)

(52) U.S. Cl.
CPC ...... *H04L 63/1433* (2013.01); *G06F 9/45558* (2013.01); *G06F 21/53* (2013.01);
(Continued)

(58) Field of Classification Search
CPC ........................................ H04L 63/1408–1433
See application file for complete search history.

(56) References Cited

U.S. PATENT DOCUMENTS 5,742,829 A    4/1998 Davis et al.
5,903,545 A    5/1999 Sabourin et al.
(Continued)

FOREIGN PATENT DOCUMENTS

CN    101093452    12/2007
CN    101770551    7/2010
(Continued)

OTHER PUBLICATIONS

Author Unknown, "Blacklists & Dynamic Reputation: Understanding Why the Evolving Threat Eludes Blacklists," www.dambala.com, 9 pages, Dambala, Atlanta, GA, USA.
(Continued)

*Primary Examiner* — Matthew T Henning
(74) *Attorney, Agent, or Firm* — Polsinelli PC

(57) ABSTRACT

Disclosed is a system configured to receive a set of network snapshot segments from an output stream of a stream processing service, compile the set of network snapshot segments from the set of messages into a first network snapshot and a second network snapshot, and compare the first network snapshot and the second network snapshot to identify a difference between the first network snapshot and the second network snapshot.

20 Claims, 7 Drawing Sheets

(51) Int. Cl.
*G06F 21/53* (2013.01)
*G06F 9/455* (2018.01)
*H04L 12/26* (2006.01)

(52) U.S. Cl.
CPC ........ *H04L 41/0886* (2013.01); *H04L 41/145* (2013.01); *H04L 43/028* (2013.01); *H04L 63/1425* (2013.01); *H04L 63/1458* (2013.01); *G06F 2009/45587* (2013.01); *G06F 2009/45595* (2013.01)

(56) References Cited

U.S. PATENT DOCUMENTS

| | | |
|---|---|---|
| 6,012,096 A | 1/2000 | Link et al. |
| 6,144,962 A | 11/2000 | Weinberg et al. |
| 6,247,058 B1 | 6/2001 | Miller et al. |
| 6,330,562 B1 | 12/2001 | Boden et al. |
| 6,525,658 B2 | 2/2003 | Streetman et al. |
| 6,597,663 B1 | 7/2003 | Rekhter |
| 6,611,896 B1 | 8/2003 | Mason, Jr. et al. |
| 6,728,779 B1 | 4/2004 | Griffin et al. |
| 6,801,878 B1 | 10/2004 | Hintz et al. |
| 6,847,993 B1 | 1/2005 | Novaes et al. |
| 6,925,490 B1 | 8/2005 | Novaes et al. |
| 6,958,998 B2 | 10/2005 | Shorey |
| 6,983,323 B2 | 1/2006 | Cantrell et al. |
| 6,996,817 B2 | 2/2006 | Birum et al. |
| 7,002,464 B2 | 2/2006 | Bruemmer et al. |
| 7,096,368 B2 | 8/2006 | Kouznetsov et al. |
| 7,120,934 B2 | 10/2006 | Ishikawa |
| 7,162,643 B1 | 1/2007 | Sankaran et al. |
| 7,181,769 B1 | 2/2007 | Keanini et al. |
| 7,185,103 B1 | 2/2007 | Jain |
| 7,251,215 B1 * | 7/2007 | Turner ................ H04L 12/4633 370/231 |
| 7,337,206 B1 | 2/2008 | Wen et al. |
| 7,353,511 B1 | 4/2008 | Ziese |
| 7,370,092 B2 | 5/2008 | Aderton et al. |
| 7,395,195 B2 | 7/2008 | Suenbuel et al. |
| 7,444,404 B2 | 10/2008 | Wetherall et al. |
| 7,466,681 B2 | 12/2008 | Ashwood-Smith et al. |
| 7,467,205 B1 | 12/2008 | Dempster et al. |
| 7,496,040 B2 | 2/2009 | Seo |
| 7,496,575 B2 | 2/2009 | Buccella et al. |
| 7,530,105 B2 | 5/2009 | Gilbert et al. |
| 7,610,330 B1 | 10/2009 | Quinn et al. |
| 7,633,942 B2 | 12/2009 | Bearden et al. |
| 7,676,570 B2 | 3/2010 | Levy et al. |
| 7,681,131 B1 | 3/2010 | Quarterman et al. |
| 7,693,947 B2 | 4/2010 | Judge et al. |
| 7,752,307 B2 | 7/2010 | Takara |
| 7,774,498 B1 | 8/2010 | Kraemer et al. |
| 7,783,457 B2 | 8/2010 | Cunningham |
| 7,844,696 B2 | 11/2010 | Labovitz et al. |
| 7,844,744 B2 | 11/2010 | Abercrombie et al. |
| 7,864,707 B2 | 1/2011 | Dimitropoulos et al. |
| 7,873,025 B2 | 1/2011 | Patel et al. |
| 7,874,001 B2 | 1/2011 | Beck et al. |
| 7,885,197 B2 | 2/2011 | Metzler |
| 7,895,649 B1 | 2/2011 | Brook et al. |
| 7,904,420 B2 | 3/2011 | Ianni |
| 7,930,752 B2 | 4/2011 | Hertzog et al. |
| 7,934,248 B1 | 4/2011 | Yehuda et al. |
| 7,957,934 B2 | 6/2011 | Greifeneder |
| 7,961,637 B2 | 6/2011 | McBeath |
| 7,970,946 B1 | 6/2011 | Djabarov et al. |
| 7,975,035 B2 | 7/2011 | Popescu et al. |
| 8,005,935 B2 | 8/2011 | Pradhan et al. |
| 8,040,232 B2 | 10/2011 | Oh et al. |
| 8,040,822 B2 | 10/2011 | Proulx et al. |
| 8,056,134 B1 | 11/2011 | Ogilvie |
| 8,135,657 B2 | 3/2012 | Kapoor et al. |
| 8,156,430 B2 | 4/2012 | Newman |
| 8,181,248 B2 | 5/2012 | Oh et al. |
| 8,185,824 B1 | 5/2012 | Mitchell et al. |
| 8,250,657 B1 | 8/2012 | Nachenberg et al. |
| 8,255,972 B2 | 8/2012 | Azagury et al. |
| 8,266,697 B2 | 9/2012 | Coffman |
| 8,281,397 B2 | 10/2012 | Vaidyanathan et al. |
| 8,291,495 B1 | 10/2012 | Burns et al. |
| 8,296,847 B2 | 10/2012 | Mendonca et al. |
| 8,365,286 B2 | 1/2013 | Poston |
| 8,370,407 B1 | 2/2013 | Devarajan et al. |
| 8,381,289 B1 | 2/2013 | Pereira et al. |
| 8,391,270 B2 | 3/2013 | Van Der Stok et al. |
| 8,407,164 B2 | 3/2013 | Malik et al. |
| 8,413,235 B1 | 4/2013 | Chen et al. |
| 8,442,073 B2 | 5/2013 | Skubacz et al. |
| 8,451,731 B1 | 5/2013 | Lee et al. |
| 8,462,212 B1 | 6/2013 | Kundu et al. |
| 8,489,765 B2 | 7/2013 | Vasseur et al. |
| 8,516,590 B1 | 8/2013 | Ranadive et al. |
| 8,527,977 B1 | 9/2013 | Cheng et al. |
| 8,549,635 B2 | 10/2013 | Muttik et al. |
| 8,570,861 B1 | 10/2013 | Brandwine et al. |
| 8,572,600 B2 | 10/2013 | Chung et al. |
| 8,572,734 B2 | 10/2013 | McConnell et al. |
| 8,572,735 B2 | 10/2013 | Ghosh et al. |
| 8,572,739 B1 | 10/2013 | Cruz et al. |
| 8,588,081 B2 | 11/2013 | Salam et al. |
| 8,600,726 B1 | 12/2013 | Varshney et al. |
| 8,613,084 B2 | 12/2013 | Dalcher |
| 8,630,316 B2 | 1/2014 | Haba |
| 8,631,464 B2 | 1/2014 | Belakhdar et al. |
| 8,640,086 B2 | 1/2014 | Bonev et al. |
| 8,661,544 B2 | 2/2014 | Yen et al. |
| 8,677,487 B2 | 3/2014 | Balupari et al. |
| 8,683,389 B1 | 3/2014 | Bar-Yam et al. |
| 8,706,914 B2 | 4/2014 | Duchesneau |
| 8,713,676 B2 | 4/2014 | Pandrangi et al. |
| 8,719,452 B1 | 5/2014 | Ding et al. |
| 8,719,835 B2 | 5/2014 | Kanso et al. |
| 8,752,042 B2 | 6/2014 | Ratica |
| 8,752,179 B2 | 6/2014 | Zaitsev |
| 8,755,396 B2 | 6/2014 | Sindhu et al. |
| 8,762,951 B1 | 6/2014 | Kosche et al. |
| 8,769,084 B2 | 7/2014 | Westerfeld et al. |
| 8,776,180 B2 | 7/2014 | Kumar et al. |
| 8,812,725 B2 | 8/2014 | Kulkarni |
| 8,813,236 B1 | 8/2014 | Saha et al. |
| 8,825,848 B1 | 9/2014 | Dotan et al. |
| 8,832,013 B1 | 9/2014 | Adams et al. |
| 8,832,461 B2 | 9/2014 | Saroiu et al. |
| 8,849,926 B2 | 9/2014 | Marzencki et al. |
| 8,881,258 B2 | 11/2014 | Paul et al. |
| 8,887,238 B2 | 11/2014 | Howard et al. |
| 8,904,520 B1 | 12/2014 | Nachenberg et al. |
| 8,931,043 B2 | 1/2015 | Cooper et al. |
| 8,954,610 B2 | 2/2015 | Berke et al. |
| 8,955,124 B2 | 2/2015 | Kim et al. |
| 8,966,625 B1 | 2/2015 | Zuk et al. |
| 8,973,147 B2 | 3/2015 | Pearcy et al. |
| 8,984,331 B2 | 3/2015 | Quinn |
| 8,990,386 B2 | 3/2015 | He et al. |
| 8,996,695 B2 | 3/2015 | Anderson et al. |
| 8,997,227 B1 | 3/2015 | Mhatre et al. |
| 9,015,716 B2 | 4/2015 | Fletcher et al. |
| 9,071,575 B2 | 6/2015 | Lemaster et al. |
| 9,088,598 B1 | 7/2015 | Zhang et al. |
| 9,110,905 B2 | 8/2015 | Polley et al. |
| 9,117,075 B1 | 8/2015 | Yeh |
| 9,152,789 B2 | 10/2015 | Natarajan et al. |
| 9,160,764 B2 | 10/2015 | Stiansen et al. |
| 9,178,906 B1 | 11/2015 | Chen et al. |
| 9,185,127 B2 | 11/2015 | Neou et al. |
| 9,191,402 B2 | 11/2015 | Yan |
| 9,197,654 B2 | 11/2015 | Ben-Shalom et al. |
| 9,225,793 B2 | 12/2015 | Dutta et al. |
| 9,237,111 B2 | 1/2016 | Banavalikar et al. |
| 9,246,773 B2 | 1/2016 | Degioanni |
| 9,258,217 B2 | 2/2016 | Duffield et al. |
| 9,281,940 B2 | 3/2016 | Matsuda et al. |
| 9,294,486 B1 | 3/2016 | Chiang et al. |
| 9,317,574 B1 | 4/2016 | Brisebois et al. |

(56) References Cited

U.S. PATENT DOCUMENTS

| | | |
|---|---|---|
| 9,319,384 B2 | 4/2016 | Yan et al. |
| 9,369,479 B2 | 6/2016 | Lin |
| 9,396,327 B2 | 6/2016 | Shimomura et al. |
| 9,405,903 B1 | 8/2016 | Xie et al. |
| 9,418,222 B1 | 8/2016 | Rivera et al. |
| 9,454,324 B1 | 9/2016 | Madhavapeddi |
| 9,465,696 B2 | 10/2016 | McNeil et al. |
| 9,501,744 B1 | 11/2016 | Brisebois et al. |
| 9,531,589 B2 | 12/2016 | Clemm et al. |
| 9,563,517 B1 | 2/2017 | Natanzon et al. |
| 9,634,915 B2 | 4/2017 | Bley |
| 9,645,892 B1 | 5/2017 | Patwardhan |
| 9,733,973 B2 | 8/2017 | Prasad et al. |
| 2001/0039579 A1* | 11/2001 | Trcka .................. G06F 21/552 709/224 |
| 2002/0053033 A1 | 5/2002 | Cooper et al. |
| 2002/0103793 A1 | 8/2002 | Koller et al. |
| 2002/0141343 A1 | 10/2002 | Bays |
| 2002/0184393 A1 | 12/2002 | Leddy et al. |
| 2003/0097439 A1 | 5/2003 | Strayer et al. |
| 2003/0145232 A1 | 7/2003 | Poletto et al. |
| 2003/0154399 A1 | 8/2003 | Zuk et al. |
| 2004/0030776 A1 | 2/2004 | Cantrell et al. |
| 2004/0243533 A1 | 12/2004 | Dempster et al. |
| 2004/0268149 A1 | 12/2004 | Aaron |
| 2005/0039104 A1 | 2/2005 | Shah et al. |
| 2005/0063377 A1 | 3/2005 | Bryant et al. |
| 2005/0166066 A1 | 7/2005 | Ahuja et al. |
| 2005/0185621 A1 | 8/2005 | Sivakumar et al. |
| 2005/0207376 A1 | 9/2005 | Ashwood-Smith et al. |
| 2005/0257244 A1 | 11/2005 | Joly et al. |
| 2005/0289244 A1 | 12/2005 | Sahu et al. |
| 2006/0048218 A1 | 3/2006 | Lingafelt et al. |
| 2006/0080733 A1 | 4/2006 | Khosmood et al. |
| 2006/0095968 A1 | 5/2006 | Portolani et al. |
| 2006/0156408 A1 | 7/2006 | Himberger et al. |
| 2006/0195448 A1 | 8/2006 | Newport |
| 2006/0272018 A1 | 11/2006 | Fouant |
| 2006/0274659 A1 | 12/2006 | Ouderkirk |
| 2006/0294219 A1 | 12/2006 | Ogawa et al. |
| 2007/0044147 A1 | 2/2007 | Choi et al. |
| 2007/0097976 A1 | 5/2007 | Wood et al. |
| 2007/0169179 A1 | 7/2007 | Narad |
| 2007/0195729 A1 | 8/2007 | Li et al. |
| 2007/0195797 A1 | 8/2007 | Patel et al. |
| 2007/0211637 A1 | 9/2007 | Mitchell |
| 2007/0300061 A1 | 12/2007 | Kim et al. |
| 2008/0022385 A1 | 1/2008 | Crowell et al. |
| 2008/0056124 A1 | 3/2008 | Nanda et al. |
| 2008/0082662 A1 | 4/2008 | Danliker et al. |
| 2008/0101234 A1 | 5/2008 | Nakil et al. |
| 2008/0126534 A1 | 5/2008 | Mueller et al. |
| 2008/0250122 A1 | 10/2008 | Zsigmond et al. |
| 2008/0270199 A1 | 10/2008 | Chess et al. |
| 2008/0301765 A1 | 12/2008 | Nicol et al. |
| 2009/0064332 A1 | 3/2009 | Porras et al. |
| 2009/0133126 A1 | 5/2009 | Jang et al. |
| 2009/0241170 A1 | 9/2009 | Kumar et al. |
| 2009/0307753 A1 | 12/2009 | Dupont et al. |
| 2009/0313373 A1 | 12/2009 | Hanna et al. |
| 2009/0313698 A1 | 12/2009 | Wahl |
| 2009/0323543 A1 | 12/2009 | Shimakura |
| 2009/0328219 A1 | 12/2009 | Narayanaswamy |
| 2010/0005288 A1 | 1/2010 | Rao et al. |
| 2010/0077445 A1 | 3/2010 | Schneider et al. |
| 2010/0095293 A1 | 4/2010 | O'Neill et al. |
| 2010/0095367 A1 | 4/2010 | Narayanaswamy |
| 2010/0138810 A1 | 6/2010 | Komatsu et al. |
| 2010/0148940 A1 | 6/2010 | Gelvin et al. |
| 2010/0153316 A1 | 6/2010 | Duffield et al. |
| 2010/0153696 A1 | 6/2010 | Beachem et al. |
| 2010/0220584 A1 | 9/2010 | DeHaan et al. |
| 2010/0235514 A1 | 9/2010 | Beachem |
| 2010/0235915 A1 | 9/2010 | Memon et al. |
| 2010/0303240 A1 | 12/2010 | Beachem |
| 2010/0319060 A1 | 12/2010 | Aiken et al. |
| 2011/0010585 A1 | 1/2011 | Bugenhagen et al. |
| 2011/0055381 A1 | 3/2011 | Narasimhan et al. |
| 2011/0055388 A1 | 3/2011 | Yumerefendi et al. |
| 2011/0066719 A1 | 3/2011 | Miryanov et al. |
| 2011/0069685 A1 | 3/2011 | Tofighbakhsh |
| 2011/0083125 A1 | 4/2011 | Komatsu et al. |
| 2011/0126136 A1 | 5/2011 | Abella et al. |
| 2011/0126275 A1 | 5/2011 | Anderson et al. |
| 2011/0145885 A1 | 6/2011 | Rivers et al. |
| 2011/0170860 A1 | 7/2011 | Smith et al. |
| 2011/0173490 A1 | 7/2011 | Narayanaswamy et al. |
| 2011/0185423 A1 | 7/2011 | Sallam |
| 2011/0196957 A1 | 8/2011 | Ayachitula et al. |
| 2011/0202655 A1 | 8/2011 | Sharma et al. |
| 2011/0225207 A1 | 9/2011 | Subramanian et al. |
| 2011/0228696 A1 | 9/2011 | Agarwal et al. |
| 2011/0277034 A1 | 11/2011 | Hanson |
| 2011/0302652 A1 | 12/2011 | Westerfeld |
| 2011/0314148 A1 | 12/2011 | Petersen et al. |
| 2012/0005542 A1 | 1/2012 | Petersen et al. |
| 2012/0079592 A1 | 3/2012 | Pandrangi |
| 2012/0102361 A1 | 4/2012 | Sass et al. |
| 2012/0102543 A1 | 4/2012 | Kohli et al. |
| 2012/0117226 A1 | 5/2012 | Tanaka et al. |
| 2012/0136996 A1 | 5/2012 | Seo et al. |
| 2012/0137278 A1 | 5/2012 | Draper et al. |
| 2012/0137361 A1 | 5/2012 | Yi et al. |
| 2012/0140626 A1 | 6/2012 | Anand et al. |
| 2012/0197856 A1 | 8/2012 | Banka et al. |
| 2012/0198541 A1 | 8/2012 | Reeves |
| 2012/0216271 A1 | 8/2012 | Cooper et al. |
| 2012/0233473 A1 | 9/2012 | Vasseur et al. |
| 2012/0240232 A1 | 9/2012 | Azuma |
| 2012/0246303 A1 | 9/2012 | Petersen et al. |
| 2012/0278021 A1 | 11/2012 | Lin et al. |
| 2013/0003538 A1 | 1/2013 | Greenburg et al. |
| 2013/0006935 A1 | 1/2013 | Grisby |
| 2013/0038358 A1 | 2/2013 | Cook et al. |
| 2013/0086272 A1 | 4/2013 | Chen et al. |
| 2013/0103827 A1 | 4/2013 | Dunlap et al. |
| 2013/0145099 A1 | 6/2013 | Liu et al. |
| 2013/0159999 A1 | 6/2013 | Chiueh et al. |
| 2013/0174256 A1 | 7/2013 | Powers |
| 2013/0179487 A1 | 7/2013 | Lubetzky et al. |
| 2013/0179879 A1 | 7/2013 | Zhang et al. |
| 2013/0198839 A1 | 8/2013 | Wei et al. |
| 2013/0246925 A1 | 9/2013 | Ahuja et al. |
| 2013/0247201 A1 | 9/2013 | Alperovitch et al. |
| 2013/0254879 A1 | 9/2013 | Chesla et al. |
| 2013/0268994 A1 | 10/2013 | Cooper et al. |
| 2013/0275579 A1 | 10/2013 | Hernandez et al. |
| 2013/0283374 A1 | 10/2013 | Zisapel et al. |
| 2013/0290521 A1 | 10/2013 | Labovitz |
| 2013/0297771 A1 | 11/2013 | Osterloh et al. |
| 2013/0304900 A1 | 11/2013 | Trabelsi et al. |
| 2013/0305369 A1 | 11/2013 | Karta et al. |
| 2013/0318357 A1 | 11/2013 | Abraham et al. |
| 2013/0326623 A1 | 12/2013 | Kruglick |
| 2013/0333029 A1 | 12/2013 | Chesla et al. |
| 2013/0347103 A1 | 12/2013 | Veteikis et al. |
| 2014/0006610 A1 | 1/2014 | Formby et al. |
| 2014/0006871 A1 | 1/2014 | Lakshmanan et al. |
| 2014/0012814 A1 | 1/2014 | Bercovici et al. |
| 2014/0033193 A1 | 1/2014 | Palaniappan |
| 2014/0047185 A1 | 2/2014 | Peterson et al. |
| 2014/0047372 A1 | 2/2014 | Gnezdov et al. |
| 2014/0059200 A1 | 2/2014 | Nguyen et al. |
| 2014/0089494 A1 | 3/2014 | Dasari et al. |
| 2014/0096058 A1 | 4/2014 | Molesky et al. |
| 2014/0115219 A1 | 4/2014 | Ajanovic et al. |
| 2014/0143825 A1 | 5/2014 | Behrendt et al. |
| 2014/0149490 A1 | 5/2014 | Luxenberg et al. |
| 2014/0156814 A1 | 6/2014 | Barabash et al. |
| 2014/0164607 A1 | 6/2014 | Bai et al. |
| 2014/0165207 A1 | 6/2014 | Engel et al. |
| 2014/0173623 A1 | 6/2014 | Chang et al. |
| 2014/0192639 A1 | 7/2014 | Smirnov |
| 2014/0201717 A1 | 7/2014 | Mascaro et al. |

(56) References Cited

U.S. PATENT DOCUMENTS

| | | |
|---|---|---|
| 2014/0215573 A1 | 7/2014 | Cepuran |
| 2014/0215621 A1 | 7/2014 | Xaypanya et al. |
| 2014/0281030 A1 | 9/2014 | Cui et al. |
| 2014/0289854 A1 | 9/2014 | Mahvi |
| 2014/0298461 A1 | 10/2014 | Hohndel et al. |
| 2014/0317737 A1 | 10/2014 | Shin et al. |
| 2014/0331276 A1 | 11/2014 | Frascadore et al. |
| 2014/0331280 A1 | 11/2014 | Porras et al. |
| 2014/0331304 A1 | 11/2014 | Wong |
| 2014/0351203 A1 | 11/2014 | Kunnatur et al. |
| 2014/0351415 A1 | 11/2014 | Harrigan et al. |
| 2014/0359695 A1 | 12/2014 | Chari et al. |
| 2015/0009840 A1 | 1/2015 | Pruthi et al. |
| 2015/0026809 A1 | 1/2015 | Altman et al. |
| 2015/0033305 A1 | 1/2015 | Shear et al. |
| 2015/0036533 A1 | 2/2015 | Sodhi et al. |
| 2015/0039751 A1 | 2/2015 | Harrigan et al. |
| 2015/0046882 A1 | 2/2015 | Menyhart et al. |
| 2015/0058976 A1 | 2/2015 | Carney et al. |
| 2015/0067143 A1 | 3/2015 | Babakhan et al. |
| 2015/0082151 A1 | 3/2015 | Liang et al. |
| 2015/0082430 A1 | 3/2015 | Sridhara et al. |
| 2015/0085665 A1 | 3/2015 | Kompella et al. |
| 2015/0095332 A1 | 4/2015 | Beisiegel et al. |
| 2015/0112933 A1 | 4/2015 | Satapathy |
| 2015/0113133 A1 | 4/2015 | Srinivas et al. |
| 2015/0124608 A1 | 5/2015 | Agarwal et al. |
| 2015/0128133 A1 | 5/2015 | Pohlmann |
| 2015/0138993 A1 | 5/2015 | Forster et al. |
| 2015/0142962 A1 | 5/2015 | Srinivas et al. |
| 2015/0195291 A1 | 7/2015 | Zuk et al. |
| 2015/0249622 A1 | 9/2015 | Phillips et al. |
| 2015/0256555 A1 | 9/2015 | Choi et al. |
| 2015/0261842 A1 | 9/2015 | Huang et al. |
| 2015/0261886 A1 | 9/2015 | Wu et al. |
| 2015/0271255 A1 | 9/2015 | Mackay et al. |
| 2015/0295945 A1 | 10/2015 | Canzanese, Jr. et al. |
| 2015/0356297 A1 | 10/2015 | Yang et al. |
| 2015/0347554 A1 | 12/2015 | Vasantham et al. |
| 2015/0358352 A1 | 12/2015 | Chasin et al. |
| 2015/0372977 A1* | 12/2015 | Yin ................... H04L 63/0236 726/1 |
| 2016/0006753 A1 | 1/2016 | McDaid et al. |
| 2016/0021131 A1 | 1/2016 | Heilig |
| 2016/0026552 A1 | 1/2016 | Holden et al. |
| 2016/0036636 A1 | 2/2016 | Erickson et al. |
| 2016/0036837 A1 | 2/2016 | Jain et al. |
| 2016/0050132 A1 | 2/2016 | Zhang et al. |
| 2016/0072815 A1 | 3/2016 | Rieke et al. |
| 2016/0094529 A1 | 3/2016 | Mityagin |
| 2016/0103692 A1 | 4/2016 | Guntaka et al. |
| 2016/0105350 A1 | 4/2016 | Greifeneder et al. |
| 2016/0112270 A1 | 4/2016 | Danait et al. |
| 2016/0119234 A1 | 4/2016 | Valencia Lopez et al. |
| 2016/0127395 A1 | 5/2016 | Underwood et al. |
| 2016/0147585 A1 | 5/2016 | Konig et al. |
| 2016/0162308 A1 | 6/2016 | Chen et al. |
| 2016/0162312 A1 | 6/2016 | Doherty et al. |
| 2016/0173446 A1 | 6/2016 | Nantel |
| 2016/0191476 A1 | 6/2016 | Schutz et al. |
| 2016/0205002 A1 | 7/2016 | Rieke et al. |
| 2016/0216994 A1 | 7/2016 | Sefidcon et al. |
| 2016/0294691 A1 | 10/2016 | Joshi |
| 2016/0308908 A1 | 10/2016 | Kirby et al. |
| 2016/0357424 A1 | 12/2016 | Pang et al. |
| 2016/0357546 A1 | 12/2016 | Chang et al. |
| 2016/0357587 A1 | 12/2016 | Yadav et al. |
| 2016/0357957 A1 | 12/2016 | Deen et al. |
| 2016/0359592 A1 | 12/2016 | Kulshreshtha et al. |
| 2016/0359628 A1 | 12/2016 | Singh et al. |
| 2016/0359658 A1 | 12/2016 | Yadav et al. |
| 2016/0359673 A1 | 12/2016 | Gupta et al. |
| 2016/0359677 A1 | 12/2016 | Kulshreshtha et al. |
| 2016/0359678 A1 | 12/2016 | Madani et al. |
| 2016/0359679 A1 | 12/2016 | Parasdehgheibi et al. |
| 2016/0359680 A1 | 12/2016 | Parasdehgheibi et al. |
| 2016/0359686 A1 | 12/2016 | Parasdehgheibi et al. |
| 2016/0359696 A1 | 12/2016 | Yadav et al. |
| 2016/0359697 A1 | 12/2016 | Scheib et al. |
| 2016/0359698 A1 | 12/2016 | Deen et al. |
| 2016/0359699 A1 | 12/2016 | Gandham et al. |
| 2016/0359700 A1 | 12/2016 | Pang et al. |
| 2016/0359701 A1 | 12/2016 | Pang et al. |
| 2016/0359703 A1 | 12/2016 | Gandham et al. |
| 2016/0359704 A1 | 12/2016 | Gandham et al. |
| 2016/0359705 A1 | 12/2016 | Parasdehgheibi et al. |
| 2016/0359708 A1 | 12/2016 | Gandham et al. |
| 2016/0359709 A1 | 12/2016 | Deen et al. |
| 2016/0359711 A1 | 12/2016 | Deen et al. |
| 2016/0359712 A1 | 12/2016 | Alizadeh Attar et al. |
| 2016/0359740 A1 | 12/2016 | Parasdehgheibi et al. |
| 2016/0359759 A1 | 12/2016 | Singh et al. |
| 2016/0359872 A1 | 12/2016 | Yadav et al. |
| 2016/0359877 A1 | 12/2016 | Kulshreshtha et al. |
| 2016/0359878 A1 | 12/2016 | Prasad et al. |
| 2016/0359879 A1 | 12/2016 | Deen et al. |
| 2016/0359880 A1 | 12/2016 | Pang et al. |
| 2016/0359881 A1 | 12/2016 | Yadav et al. |
| 2016/0359888 A1 | 12/2016 | Gupta et al. |
| 2016/0359889 A1 | 12/2016 | Yadav et al. |
| 2016/0359890 A1 | 12/2016 | Deen et al. |
| 2016/0359891 A1 | 12/2016 | Pang et al. |
| 2016/0359897 A1 | 12/2016 | Yadav et al. |
| 2016/0359912 A1 | 12/2016 | Gupta et al. |
| 2016/0359913 A1 | 12/2016 | Gupta et al. |
| 2016/0359914 A1 | 12/2016 | Deen et al. |
| 2016/0359915 A1 | 12/2016 | Gupta et al. |
| 2016/0359917 A1 | 12/2016 | Rao et al. |
| 2016/0373481 A1 | 12/2016 | Sultan et al. |
| 2017/0034018 A1 | 2/2017 | Parasdehgheibi et al. |
| 2017/0070582 A1 | 3/2017 | Desai et al. |
| 2018/0006911 A1 | 1/2018 | Dickey |

FOREIGN PATENT DOCUMENTS

| | | |
|---|---|---|
| CN | 102521537 | 6/2012 |
| CN | 103023970 | 4/2013 |
| CN | 103716137 | 4/2014 |
| CN | 104065518 | 9/2014 |
| EP | 0811942 | 12/1997 |
| EP | 1383261 | 1/2004 |
| EP | 1450511 | 8/2004 |
| EP | 2045974 | 4/2008 |
| EP | 2887595 | 6/2015 |
| JP | 2009-016906 | 1/2009 |
| KR | 1394338 | 5/2014 |
| WO | WO 2007/014314 | 2/2007 |
| WO | WO 2007/070711 | 6/2007 |
| WO | WO 2008/069439 | 6/2008 |
| WO | WO 2013/030830 | 3/2013 |
| WO | WO 2015/042171 | 3/2015 |
| WO | WO 2015/099778 | 7/2015 |
| WO | WO 2016/004075 | 1/2016 |
| WO | WO 2016/019523 | 2/2016 |

OTHER PUBLICATIONS

Aydin, Galip, et al., "Architecture and Implementation of a Scalable Sensor Data Storage and Analysis Using Cloud Computing and Big Data Technologies," Journal of Sensors, vol. 2015, Article ID 834217, Feb. 2015, 11 pages.

Backes, Michael, et al., "Data Lineage in Malicious Environments," IEEE 2015, pp. 1-13.

Bauch, Petr, "Reader's Report of Master's Thesis, Analysis and Testing of Distributed NoSQL Datastore Riak," May 28, 2015, Brno. 2 pages.

Bayati, Mohsen, et al., "Message-Passing Algorithms for Sparse Network Alignment," Mar. 2013, 31 pages.

Berezinski, Przemyslaw, et al., "An Entropy-Based Network Anomaly Detection Method," Entropy, 2015, vol. 17, www.mdpi.com/journal/entropy, pp. 2367-2408.

(56) References Cited

OTHER PUBLICATIONS

Berthier, Robin, et al. "Nfsight: Netflow-based Network Awareness Tool," 2010, 16 pages.
Bhuyan, Dhiraj, "Fighting Bots and Botnets," 2006, pp. 23-28.
Blair, Dana, et al., U.S. Appl. No. 62/106,006, filed Jan. 21, 2015, entitled "Monitoring Network Policy Compliance."
Bosch, Greg, "Virtualization," 2010, 33 pages.
Breen, Christopher, "MAC 911, How to dismiss Mac App Store Notifications," Macworld.com, Mar. 24, 2014, 3 pages.
Chari, Suresh, et al., "Ensuring continuous compliance through reconciling policy with usage," Proceedings of the $18^{th}$ ACM symposium on Access control models and technologies (SACMAT '13). ACM, New York, NY, USA, 49-60.
Chen, Xu, et al., "Automating network application dependency discovery: experiences, limitations, and new solutions," 8th USENIX conference on Operating systems design and implementation (OSDI'08), USENIX Association, Berkeley, CA, USA, 117-130.
Chou, C.W., et al., "Optical Clocks and Relativity," Science vol. 329, Sep. 24, 2010, pp. 1630-1633.
Cisco Systems, Inc., "A Cisco Guide to Defending Against Distributed Denial of Service Attacks," May 3, 2016, 34 pages.
Cisco Systems, Inc., "Cisco Application Visibility and Control," Oct. 2011, 2 pages.
Cisco Systems, Inc., "Cisco Tetration Platform Data Sheet", Updated Mar. 5, 2018, 21 pages.
Cisco Technology, Inc., "Cisco Lock-and-Key:Dynamic Access Lists," http://www/cisco.com/c/en/us/suppport/docs/security-vpn/lock-key/7604-13.html; Updated Jul. 12, 2006, 16 pages.
Di Lorenzo, Guisy, et al., "EXSED: An Intelligent Tool for Exploration of Social Events Dynamics from Augmented Trajectories," Mobile Data Management (MDM), pp. 323-330, Jun. 3-6, 2013.
Duan, Yiheng, et al., Detective: Automatically Identify and Analyze Malware Processes in Forensic Scenarios via DLLs, IEEE ICC 2015—Next Generation Networking Symposium, pp. 5691-5696.
Feinstein, Laura, et al., "Statistical Approaches to DDoS Attack Detection and Response," Proceedings of the DARPA Information Survivability Conference and Exposition (DISCEX '03), Apr. 2003, 12 pages.
George, Ashley, et al., "NetPal: A Dynamic Network Administration Knowledge Base," 2008, pp. 1-14.
Goldsteen, Abigail, et al., "A Tool for Monitoring and Maintaining System Trustworthiness at Run Time," REFSQ (2015), pp. 142-147.
Heckman, Sarah, et al., "On Establishing a Benchmark for Evaluating Static Analysis Alert Prioritization and Classification Techniques," IEEE, 2008; 10 pages.
Hewlett-Packard, "Effective use of reputation intelligence in a security operations center," Jul. 2013, 6 pages.
Hideshima, Yusuke, et al., "STARMINE: A Visualization System fro Cyber Attacks," https://www.researchgate.net/publication/221536306, Feb. 2006, 9 pages.
Huang, Hing-Jie, et al., "Clock Skew Based Node Identification in Wireless Sensor Networks," IEEE, 2008, 5 pages.
Ives, Herbert, E., et al., "An Experimental Study of the Rate of a Moving Atomic Clock," Journal of the Optical Society of America, vol. 28, No. 7, Jul. 1938, pp. 215-226.
Janoff, Christian, et al., "Cisco Compliance Solution for HIPAA Security Rule Design and Implementation Guide," Cisco Systems, Inc., Updated Nov. 14, 2015, part 1 of 2, 350 pages.
Janoff, Christian, et al., "Cisco Compliance Solution for HIPAA Security Rule Design and Implementation Guide," Cisco Systems, Inc., Updated Nov. 14, 2015, part 2 of 2, 588 pages.
Kim, Myung-Sup, et al. "A Flow-based Method for Abnormal Network Traffic Detection, " IEEE, 2004, pp. 599-612.
Li, Ang, et al., "Fast Anomaly Detection for Large Data Centers," Global Telecommunications Conference (GLOBECOM 2010, Dec. 2010, 6 pages.
Li, Bingbong, et al, "A Supervised Machine Learning Approach to Classify Host Roles on Line Using sFlow," in Proceedings of the first edition workshop on High performance and programmable networking, 2013, ACM, New York, NY, USA, 53-60.
Liu, Ting, et al., "Impala: A Middleware System for Managing Autonomic, Parallel Sensor Systems," In Proceedings of the Ninth ACM SIGPLAN Symposium on Principles and Practice of Parallel Programming(PPoPP '03), ACM, New York, NY, USA, Jun. 11-13, 2003, pp. 107-118.
Natarajan, Arun, et al., "NSDMiner: Automated Discovery of Network Service Dependencies," Institute of Electrical and Electronics Engineers INFOCOM, Feb. 2012, 9 pages.
Navaz, A.S. Syed, et al., "Entropy based Anomaly Detection System to Prevent DDoS Attacks in Cloud," International Journal of computer Applications (0975-8887), vol. 62, No. 15, Jan. 2013, pp. 42-47.
Nilsson, Dennis K., et al., "Key Management and Secure Software Updates in Wireless Process Control Environments," In Proceedings of the First ACM Conference on Wireless Network Security (WiSec '08), ACM, New York, NY, USA, Mar. 31-Apr. 2, 2008, pp. 100-108.
Nunnally, Troy, et al., "P3D: A Parallel 3D Coordinate Visualization for Advanced Network Scans," IEEE 2013, Jun. 9-13, 2013, 6 pages.
Ohta, Kohei, et al., "Detection, Defense, and Tracking of Internet-Wide Illegal Acces in a Distributed Manner," 2000, pp. 1-16.
Pathway Systems International Inc., "How Blueprints does Intergration," Apr. 15, 2014, 9 pages, http://pathwaysytems.com/company-blog/.
Popa, Lucian, et al., "Macroscope: End-Point Approach to Networked Application Dependency Discovery," CoNEXT'09, Dec. 1-4, 2009, Rome, Italy, 12 pages.
Prasad, K. Munivara, et al., "An Efficient Detection of Flooding Attacks to Internet Threat Monitors (ITM) using Entropy Variations under Low Traffic," Computing Communication & Networking Technologies (ICCCNT '12), Jul. 26-28, 2012, 11 pages.
Sachan, Mrinmaya, et al., "Solving Electrical Networks to incorporate Supervision in Random Walks," May 13-17, 2013, pp. 109-110.
Sammarco, Matteo, et al., "Trace Selection for Improved WLAN Monitoring," Aug. 16, 2013, pp. 9-14.
Shneiderman, Ben, et al., "Network Visualization by Semantic Substrates," Visualization and Computer Graphics, vol. 12, No. 5, pp. 733,740, Sep.-Oct. 2006.
Thomas, R., "Bogon Dotted Decimal List," Version 7.0, Team Cymru NOC, Apr. 27, 2012, 5 pages.
Wang, Ru, et al., "Learning directed acyclic graphs via bootstarp aggregating," 2014, 47 pages, http://arxiv.org/abs/1406.2098.
Wang, Yongjun, et al., "A Network Gene-Based Framework for Detecting Advanced Persistent Threats," Nov. 2014, 7 pages.
Witze, Alexandra, "Special relativity aces time trial, 'Time dilation' predicted by Einstein confirmed by lithium ion experiment," Nature, Sep. 19, 2014, 3 pages.
Woodberg, Brad, "Snippet from Juniper Srx Series" Jun. 17, 2013, 1 page, O'Reilly Media, Inc.
Zatrochova, Zuzana, "Analysis and Testing of Distributed NoSQL Datastore Riak," Spring, 2015, 76 pages.
Zhang, Yue, et al., "CANTINA: A Content-Based Approach to Detecting Phishing Web Sites," May 8-12, 2007, pp. 639-648.

* cited by examiner

MECHANISM FOR IDENTIFYING DIFFERENCES BETWEEN NETWORK SNAPSHOTS

CROSS-REFERENCE TO RELATED APPLICATION

This application claims priority to U.S. Provisional Application 62/622,019, filed on Jan. 25, 2018, entitled "FRAMEWORK FOR IMPLEMENTING NETWORK POLICY ENFORCEMENT," the content of which is incorporated herein by reference in its entirety.

TECHNICAL FIELD

The subject matter of this disclosure relates in general to the field of computer networks, and more specifically to efficiently transferring large amounts of data generated by systems managing a network.

BACKGROUND

An enterprise application is a set of workloads (e.g., computing, networking, and storage) that are generally distributed across various nodes (or endpoints) of a network and the relationships (e.g., connectivity, dependencies, network and security policies, etc.) between the workloads. A typical application may include a presentation tier, an application tier, and a data tier. The presentation tier may depend on the application tier and authentication services, and the application tier may depend on the web tier and external network services (e.g., a travel reservation system, an ordering tool, a billing tool, etc.). These tiers may further depend on firewall, load balancing, wide area network (WAN) acceleration, and other network services. An enterprise can include hundreds or thousands of applications of similar and different architectures.

An expansive or thorough understanding of a data center and applications running in the data center can be critical for network management tasks such as anomaly detection (e.g., network attacks and misconfiguration), asset management (e.g., monitoring, capacity planning, consolidation, migration, and continuity planning), and compliance (e.g. conformance with governmental regulations, industry standards, and corporate policies). Despite the complexities of the interrelationships among workloads discussed above, the many approaches for developing insight into an enterprise's workloads require comprehensive knowledge on the part of human operators and processes that are manual and largely customized for a particular enterprise.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
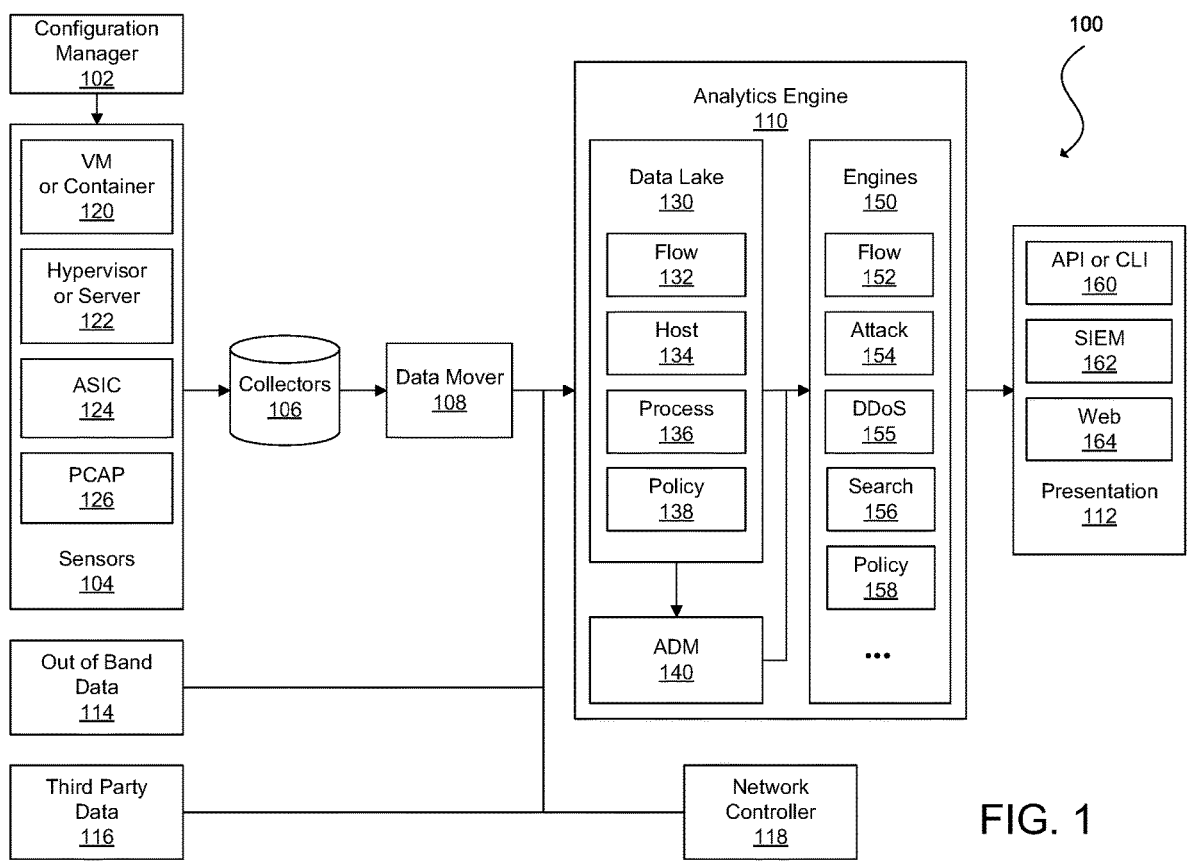
FIG. 1 illustrates an example of a network traffic monitoring system, in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Aspects of the subject technology relate to a network traffic monitoring system configured to receive network data and process data generated by sensors deployed across nodes of a network and generate a network snapshot based on the network data and the process data. The system may partition the network snapshot into a set of network snapshot segments and provide the set of network snapshot segments to a stream processing system, wherein the set of network snapshot segments are configured to be transmitted via a snapshot stream managed by the stream processing system to a subscriber system.

Aspects of the subject technology relate to a subscriber system configured to receive a set of network snapshot segments from an output stream of a stream processing service, compile the set of network snapshot segments from the set of messages into a first network snapshot and a second network snapshot, and compare the first network snapshot and the second network snapshot to identify a difference between the first network snapshot and the second network snapshot.

DESCRIPTION

Various embodiments of the disclosure are discussed in detail below. While specific implementations are discussed, it should be understood that this is done for illustrative purposes only. A person skilled in the relevant art will recognize that other components and configurations may be used without departing from the spirit and scope of the disclosure.

Sensors deployed in a network can be used to gather network information related to network traffic of nodes operating in the network and process information for nodes and applications running in the network. Gathered network information can be analyzed to provide insights into the operation of the nodes in the network, otherwise referred to as analytics. In particular, discovered application or inventories, application dependencies, policies, efficiencies, resource and bandwidth usage, and network flows can be determined for the network using the network traffic data. For example, an analytics engine can be configured to automate discovery of applications running in the network, map the applications' interdependencies, or generate a set of proposed network policies for implementation.

The analytics engine can monitor network information, process information, and other relevant information of traffic passing through the network using a sensor network that provides multiple perspectives for the traffic. The sensor network can include sensors for networking devices (e.g., routers, switches, network appliances), physical servers, hypervisors or shared kernels, and virtual partitions (e.g., VMs or containers), and other network elements. The analytics engine can analyze the network information, process information, and other pertinent information to determine various network insights.

The analytics engine may continuously track this information over time and generate state information associated with a particular moment in time. The state information may be considered a "snapshot." The analytics engine can periodically take snapshots of the states of applications, servers, network devices, and/or other elements of the network. In other embodiments, the analytics engine can capture the snapshots when events of interest occur, such as a change to a network policy; an application experiencing latency that exceeds an application latency threshold; the network experiencing latency that exceeds a network latency threshold; failure of server, network device, or other network element; and similar circumstances. Snapshots can include a variety of telemetry associated with network elements.

Several end users may be interested in this information. However, each snapshot for an entire network or network cluster, may be quite large in size. Furthermore, the network state may be updated often, causing several snapshots to be created and created often. There are many technical limitations to transmitting and receiving that amount of data often enough for end users to stay in sync, especially when multiple snapshots are generated in relatively quick succession.

Aspects of the subject technology address these technical problems by fragmenting each snapshot into smaller chunks or segments. A first segment may be tagged with a "start" label and a last segment may be tagged with an "end" label. Each segment of a snapshot may also be numbered (e.g., from 0 to n, where n is assigned to the last segment).

The segments of the snapshot are then provided to a stream processing service for distribution in an output stream. The stream processing service allows for several end users to subscribe to the output stream containing the snapshot segments (and snapshot fragments for subsequent snapshots).

A client application may subscribe to the output stream and begin receiving stream messages. Each stream message may include a snapshot segment. In order to compile a snapshot, however, all of the segments for the snapshot must be received. The client application may use the tag (e.g., start/end tags) and/or the enumeration of a received segment to determine which segment has been transmitted, and which segments should be requested from the stream processing service. For example, if the first segment received by a client application is segment 5, the client application may request segments 0-4 from the stream processing service or request transmission of the stream starting from 5 segments back (e.g., rewinding the stream). Once a segment tagged with the "end" label is received, the client application may compile the segments into a snapshot. In some cases, the snapshot may be converted into a generic format that may be consumed by multiple diverse parties.

After a first network snapshot is received, the client application may continue to receive messages from the output stream and compile subsequent network snapshots. The client application may compare a first network snapshot and a second network snapshot to compute a delta or a difference between the network snapshots. This delta or difference may represent a change in a network policy or other data associated with the network. The delta or difference may then be provided to an end user for consumption. For example, the end user may use the delta to update their snapshot stored by the end user so that their snapshot may be in sync with the most recent snapshot provided by the output stream without having to re-implement the entire snapshot.

The client application may interface with an end user (e.g., an end user device) and provide additional features to the end user. For example, the end user may provide one or more lists of IP addresses, subnets, or ranges of IP addresses that the end user has an interest in. The client application may filter out the data in the snapshots based on the list of IP addresses and provide the desired data to the end user. Alternatively, the client application may compute the delta or difference in snapshots associated with the list of IP address pool of interest. The reduced set of data may be stored by the end user.

In some situations, network snapshots may be generated and provided to the stream processing service at a fast pace. For example, if network snapshots are generated based on network events or policy updates and the network events or policy updates occur in rapid succession, multiple network snapshots may be provided to the stream processing service before a client application can finish receiving and compiling a first network snapshot. In order to keep the client application up to date, the client application can skip intervening network snapshots and begin receiving the most recent network snapshot.

Referring now to the drawings, FIG. 1 is an illustration of a network traffic monitoring system 100 in accordance with an embodiment. The network traffic monitoring system 100 can include a configuration manager 102, sensors 104, a collector module 106, a data mover module 108, an analytics engine 110, and a presentation module 112. In FIG. 1, the analytics engine 110 is also shown in communication with out-of-band data sources 114, third party data sources 116, and a network controller 118.

The configuration manager 102 can be used to provision and maintain the sensors 104, including installing sensor software or firmware in various nodes of a network, configuring the sensors 104, updating the sensor software or firmware, among other sensor management tasks. For example, the sensors 104 can be implemented as virtual partition images (e.g., virtual machine (VM) images or container images), and the configuration manager 102 can distribute the images to host machines. In general, a virtual partition may be an instance of a VM, container, sandbox, or other isolated software environment. The software environment may include an operating system and application software. For software running within a virtual partition, the virtual partition may appear to be, for example, one of many servers or one of many operating systems executed on a single physical server. The configuration manager 102 can instantiate a new virtual partition or migrate an existing partition to a different physical server. The configuration manager 102 can also be used to configure the new or migrated sensor.

The configuration manager 102 can monitor the health of the sensors 104. For example, the configuration manager 102 may request for status updates and/or receive heartbeat messages, initiate performance tests, generate health checks, and perform other health monitoring tasks. In some embodiments, the configuration manager 102 can also authenticate the sensors 104. For instance, the sensors 104 can be assigned a unique identifier, such as by using a one-way hash function of a sensor's basic input/out system (BIOS) universally unique identifier (UUID) and a secret key stored by the configuration image manager 102. The UUID can be a large number that may be difficult for a malicious sensor or other device or component to guess. In some embodiments, the configuration manager 102 can keep the sensors 104 up to date by installing the latest versions of sensor software and/or applying patches. The configuration manager 102 can obtain these updates automatically from a local source or the Internet.

The sensors 104 can reside on various nodes of a network, such as a virtual partition (e.g., VM or container) 120; a hypervisor or shared kernel managing one or more virtual partitions and/or physical servers 122, an application-specific integrated circuit (ASIC) 124 of a switch, router, gateway, or other networking device, or a packet capture (pcap) 126 appliance (e.g., a standalone packet monitor, a device connected to a network devices monitoring port, a device connected in series along a main trunk of a datacenter, or similar device), or other element of a network. The sensors 104 can monitor network traffic between nodes, and send network traffic data and corresponding data (e.g., host data, process data, user data, etc.) to the collectors 106 for storage. For example, the sensors 104 can sniff packets being sent over its hosts' physical or virtual network interface card (NIC), or individual processes can be configured to report network traffic and corresponding data to the sensors 104. Incorporating the sensors 104 on multiple nodes and within multiple partitions of some nodes of the network can provide for robust capture of network traffic and corresponding data from each hop of data transmission. In some embodiments, each node of the network (e.g., VM, container, or other virtual partition 120, hypervisor, shared kernel, or physical server 122, ASIC 124, pcap 126, etc.) includes a respective sensor 104. However, it should be understood that various software and hardware configurations can be used to implement the sensor network 104.

As the sensors 104 capture communications and corresponding data, they may continuously send network traffic data to the collectors 106. The network traffic data can include metadata relating to a packet, a collection of packets, a flow, a bidirectional flow, a group of flows, a session, or a network communication of another granularity. That is, the network traffic data can generally include any information describing communication on all layers of the Open Systems Interconnection (OSI) model. For example, the network traffic data can include source/destination MAC address, source/destination IP address, protocol, port number, etc. In some embodiments, the network traffic data can also include summaries of network activity or other network statistics such as number of packets, number of bytes, number of flows, bandwidth usage, response time, latency, packet loss, jitter, and other network statistics.

The sensors 104 can also determine additional data for each session, bidirectional flow, flow, packet, or other more granular or less granular network communication. The additional data can include host and/or endpoint information, virtual partition information, sensor information, process information, user information, tenant information, application information, network topology, application dependency mapping, cluster information, or other information corresponding to each flow.

In some embodiments, the sensors 104 can perform some preprocessing of the network traffic and corresponding data before sending the data to the collectors 106. For example, the sensors 104 can remove extraneous or duplicative data or they can create summaries of the data (e.g., latency, number of packets per flow, number of bytes per flow, number of flows, etc.). In some embodiments, the sensors 104 can be configured to only capture certain types of network information and disregard the rest. In some embodiments, the sensors 104 can be configured to capture only a representative sample of packets (e.g., every 1,000th packet or other suitable sample rate) and corresponding data.

Since the sensors 104 may be located throughout the network, network traffic and corresponding data can be collected from multiple vantage points or multiple perspectives in the network to provide a more comprehensive view of network behavior. The capture of network traffic and corresponding data from multiple perspectives rather than just at a single sensor located in the data path or in communication with a component in the data path, allows the data to be correlated from the various data sources, which may be used as additional data points by the analytics engine 110. Further, collecting network traffic and corresponding data from multiple points of view ensures more accurate data is captured. For example, other types of sensor networks may be limited to sensors running on external-facing network devices (e.g., routers, switches, network appliances, etc.) such that east-west traffic, including VM-to-VM or container-to-container traffic on a same host, may not be monitored. In addition, packets that are dropped before traversing a network device or packets containing errors may not be accurately monitored by other types of sensor networks. The sensor network 104 of various embodiments substantially mitigates or eliminates these issues altogether by locating sensors at multiple points of potential failure. Moreover, the network traffic monitoring system 100 can verify multiple instances of data for a flow (e.g., source endpoint flow data, network device flow data, and endpoint flow data) against one another.

In some embodiments, the network traffic monitoring system 100 can assess a degree of accuracy of flow data sets from multiple sensors and utilize a flow data set from a single sensor determined to be the most accurate and/or complete. The degree of accuracy can be based on factors such as network topology (e.g., a sensor closer to the source may be more likely to be more accurate than a sensor closer to the destination), a state of a sensor or a node hosting the sensor (e.g., a compromised sensor/node may have less accurate flow data than an uncompromised sensor/node), or flow data volume (e.g., a sensor capturing a greater number of packets for a flow may be more accurate than a sensor capturing a smaller number of packets).

In some embodiments, the network traffic monitoring system 100 can assemble the most accurate flow data set and corresponding data from multiple sensors. For instance, a first sensor along a data path may capture data for a first packet of a flow but may be missing data for a second packet of the flow while the situation is reversed for a second sensor along the data path. The network traffic monitoring system 100 can assemble data for the flow from the first packet captured by the first sensor and the second packet captured by the second sensor.

As discussed, the sensors 104 can send network traffic and corresponding data to the collectors 106. In some embodiments, each sensor can be assigned to a primary collector and a secondary collector as part of a high availability scheme. If the primary collector fails or communications between the sensor and the primary collector are not otherwise possible, a sensor can send its network traffic and corresponding data to the secondary collector. In other embodiments, the sensors 104 are not assigned specific collectors but the network traffic monitoring system 100 can determine an optimal collector for receiving the network traffic and corresponding data through a discovery process. In such embodiments, a sensor can change where it sends it network traffic and corresponding data if its environments changes, such as if a default collector fails or if the sensor is migrated to a new location and it would be optimal for the sensor to send its data to a different collector. For example, it may be preferable for the sensor to send its network traffic and corresponding data on a particular path and/or to a particular collector based on latency, shortest path, monetary cost (e.g., using private resources versus a public resources provided by a public cloud provider), error rate, or some combination of these factors. In other embodiments, a sensor can send different types of network traffic and corresponding data to different collectors. For example, the sensor can send first network traffic and corresponding data related to one type of process to one collector and second network traffic and corresponding data related to another type of process to another collector.

The collectors 106 can be any type of storage medium that can serve as a repository for the network traffic and corresponding data captured by the sensors 104. In some embodiments, data storage for the collectors 106 is located in an in-memory database, such as dashDB from IBM®, although it should be appreciated that the data storage for the collectors 106 can be any software and/or hardware capable of providing rapid random access speeds typically used for analytics software. In various embodiments, the collectors 106 can utilize solid state drives, disk drives, magnetic tape drives, or a combination of the foregoing according to cost, responsiveness, and size requirements. Further, the collectors 106 can utilize various database structures such as a normalized relational database or a NoSQL database, among others.

In some embodiments, the collectors 106 may only serve as network storage for the network traffic monitoring system 100. In such embodiments, the network traffic monitoring system 100 can include a data mover module 108 for retrieving data from the collectors 106 and making the data available to network clients, such as the components of the analytics engine 110. In effect, the data mover module 108 can serve as a gateway for presenting network-attached storage to the network clients. In other embodiments, the collectors 106 can perform additional functions, such as organizing, summarizing, and preprocessing data. For example, the collectors 106 can tabulate how often packets of certain sizes or types are transmitted from different nodes of the network. The collectors 106 can also characterize the traffic flows going to and from various nodes. In some embodiments, the collectors 106 can match packets based on sequence numbers, thus identifying traffic flows and connection links. As it may be inefficient to retain all data indefinitely in certain circumstances, in some embodiments, the collectors 106 can periodically replace detailed network traffic data with consolidated summaries. In this manner, the collectors 106 can retain a complete dataset describing one period (e.g., the past minute or other suitable period of time), with a smaller dataset of another period (e.g., the previous 2-10 minutes or other suitable period of time), and progressively consolidate network traffic and corresponding data of other periods of time (e.g., day, week, month, year, etc.). In some embodiments, network traffic and corresponding data for a set of flows identified as normal or routine can be winnowed at an earlier period of time while a more complete data set may be retained for a lengthier period of time for another set of flows identified as anomalous or as an attack.

Computer networks may be exposed to a variety of different attacks that expose vulnerabilities of computer systems in order to compromise their security. Some network traffic may be associated with malicious programs or devices. The analytics engine 110 may be provided with examples of network states corresponding to an attack and network states corresponding to normal operation. The analytics engine 110 can then analyze network traffic and corresponding data to recognize when the network is under attack. In some embodiments, the network may operate within a trusted environment for a period of time so that the analytics engine 110 can establish a baseline of normal operation. Since malware is constantly evolving and changing, machine learning may be used to dynamically update models for identifying malicious traffic patterns.

In some embodiments, the analytics engine 110 may be used to identify observations which differ from other examples in a dataset. For example, if a training set of example data with known outlier labels exists, supervised anomaly detection techniques may be used. Supervised anomaly detection techniques utilize data sets that have been labeled as normal and abnormal and train a classifier. In a case in which it is unknown whether examples in the training data are outliers, unsupervised anomaly techniques may be used. Unsupervised anomaly detection techniques may be used to detect anomalies in an unlabeled test data set under the assumption that the majority of instances in the data set are normal by looking for instances that seem to fit to the remainder of the data set.

The analytics engine 110 can include a data lake 130, an application dependency mapping (ADM) module 140, and elastic processing engines 150. The data lake 130 is a large-scale storage repository that provides massive storage for various types of data, enormous processing power, and the ability to handle nearly limitless concurrent tasks or jobs. In some embodiments, the data lake 130 is implemented using the Hadoop® Distributed File System (HDFS™) from Apache® Software Foundation of Forest Hill, Md. HDFS™ is a highly scalable and distributed file system that can scale to thousands of cluster nodes, millions of files, and petabytes of data. HDFS™ is optimized for batch processing where data locations are exposed to allow computations to take place where the data resides. HDFS™ provides a single namespace for an entire cluster to allow for data coherency in a write-once, read-many access model. That is, clients can only append to existing files in the node. In HDFS™, files are separated into blocks, which are typically 64 MB in size and are replicated in multiple data nodes. Clients access data directly from data nodes.

In some embodiments, the data mover 108 receives raw network traffic and corresponding data from the collectors 106 and distributes or pushes the data to the data lake 130. The data lake 130 can also receive and store out-of-band data 114, such as statuses on power levels, network availability, server performance, temperature conditions, cage door positions, and other data from internal sources, and third party data 116, such as security reports (e.g., provided by Cisco® Systems, Inc. of San Jose, Calif., Arbor Networks® of Burlington, Mass., Symantec® Corp. of Sunnyvale, Calif., Sophos® Group plc of Abingdon, England, Microsoft® Corp. of Seattle, Wash., Verizon® Communications, Inc. of New York, N.Y., among others), geolocation data, IP watch lists, Whois data, configuration management database (CMDB) or configuration management system (CMS) as a service, and other data from external sources. In other embodiments, the data lake 130 may instead fetch or pull raw traffic and corresponding data from the collectors 106 and relevant data from the out-of-band data sources 114 and the third party data sources 116. In yet other embodiments, the functionality of the collectors 106, the data mover 108, the out-of-band data sources 114, the third party data sources 116, and the data lake 130 can be combined. Various combinations and configurations are possible as would be known to one of ordinary skill in the art.

Each component of the data lake 130 can perform certain processing of the raw network traffic data and/or other data (e.g., host data, process data, user data, out-of-band data or third party data) to transform the raw data to a form useable by the elastic processing engines 150. In some embodiments, the data lake 130 can include repositories for flow attributes 132, host and/or endpoint attributes 134, process attributes 136, and policy attributes 138. In some embodiments, the data lake 130 can also include repositories for VM or container attributes, application attributes, tenant attributes, network topology, application dependency maps, cluster attributes, etc.

The flow attributes 132 relate to information about flows traversing the network. A flow is generally one or more packets sharing certain attributes that are sent within a network within a specified period of time. The flow attributes 132 can include packet header fields such as a source address (e.g., Internet Protocol (IP) address, Media Access Control (MAC) address, Domain Name System (DNS) name, or other network address), source port, destination address, destination port, protocol type, class of service, among other fields. The source address may correspond to a first endpoint (e.g., network device, physical server, virtual partition, etc.) of the network, and the destination address may correspond to a second endpoint, a multicast group, or a broadcast domain. The flow attributes 132 can also include aggregate packet data such as flow start time, flow end time, number of packets for a flow, number of bytes for a flow, the union of TCP flags for a flow, among other flow data.

The host and/or endpoint attributes 134 describe host and/or endpoint data for each flow, and can include host and/or endpoint name, network address, operating system, CPU usage, network usage, disk space, ports, logged users, scheduled jobs, open files, and information regarding files and/or directories stored on a host and/or endpoint (e.g., presence, absence, or modifications of log files, configuration files, device special files, or protected electronic information). As discussed, in some embodiments, the host and/or endpoints attributes 134 can also include the out-of-band data 114 regarding hosts such as power level, temperature, and physical location (e.g., room, row, rack, cage door position, etc.) or the third party data 116 such as whether a host and/or endpoint is on an IP watch list or otherwise associated with a security threat, Whois data, or geocoordinates. In some embodiments, the out-of-band data 114 and the third party data 116 may be associated by process, user, flow, or other more granular or less granular network element or network communication.

The process attributes 136 relate to process data corresponding to each flow, and can include process name (e.g., bash, httpd, netstat, etc.), ID, parent process ID, path (e.g., /usr2/username/bin/, /usr/local/bin, /usr/bin, etc.), CPU utilization, memory utilization, memory address, scheduling information, nice value, flags, priority, status, start time, terminal type, CPU time taken by the process, the command that started the process, and information regarding a process owner (e.g., user name, ID, user's real name, e-mail address, user's groups, terminal information, login time, expiration date of login, idle time, and information regarding files and/or directories of the user).

The policy attributes 138 contain information relating to network policies. Policies establish whether a particular flow is allowed or denied by the network as well as a specific route by which a packet traverses the network. Policies can also be used to mark packets so that certain kinds of traffic receive differentiated service when used in combination with queuing techniques such as those based on priority, fairness, weighted fairness, token bucket, random early detection, round robin, among others. The policy attributes 138 can include policy statistics such as a number of times a policy was enforced or a number of times a policy was not enforced. The policy attributes 138 can also include associations with network traffic data. For example, flows found to be non-conformant can be linked or tagged with corresponding policies to assist in the investigation of non-conformance.

The analytics engine 110 may include any number of engines 150, including for example, a flow engine 152 for identifying flows (e.g., flow engine 152) or an attacks engine 154 for identify attacks to the network. In some embodiments, the analytics engine can include a separate distributed denial of service (DDoS) attack engine 155 for specifically detecting DDoS attacks. In other embodiments, a DDoS attack engine may be a component or a sub-engine of a general attacks engine. In some embodiments, the attacks engine 154 and/or the DDoS engine 155 can use machine learning techniques to identify security threats to a network. For example, the attacks engine 154 and/or the DDoS engine 155 can be provided with examples of network states corresponding to an attack and network states corresponding to normal operation. The attacks engine 154 and/or the DDoS engine 155 can then analyze network traffic data to recognize when the network is under attack. In some embodiments, the network can operate within a trusted environment for a time to establish a baseline for normal network operation for the attacks engine 154 and/or the DDoS.

The analytics engine 110 may further include a search engine 156. The search engine 156 may be configured, for example to perform a structured search, an NLP (Natural Language Processing) search, or a visual search. Data may be provided to the engines from one or more processing components.

The analytics engine 110 can also include a policy engine 158 that manages network policy, including creating and/or importing policies, monitoring policy conformance and non-conformance, enforcing policy, simulating changes to policy or network elements affecting policy, among other policy-related tasks.

The ADM module 140 can determine dependencies of applications of the network. That is, particular patterns of traffic may correspond to an application, and the interconnectivity or dependencies of the application can be mapped to generate a graph for the application (i.e., an application dependency mapping). In this context, an application refers to a set of networking components that provides connectivity for a given set of workloads. For example, in a three-tier architecture for a web application, first endpoints of the web tier, second endpoints of the application tier, and third endpoints of the data tier make up the web application. The ADM module 140 can receive input data from various repositories of the data lake 130 (e.g., the flow attributes 132, the host and/or endpoint attributes 134, the process attributes 136, etc.). The ADM module 140 may analyze the input data to determine that there is first traffic flowing between external endpoints on port 80 of the first endpoints corresponding to Hypertext Transfer Protocol (HTTP) requests and responses. The input data may also indicate second traffic between first ports of the first endpoints and second ports of the second endpoints corresponding to application server requests and responses and third traffic flowing between third ports of the second endpoints and fourth ports of the third endpoints corresponding to database requests and responses. The ADM module 140 may define an ADM for the web application as a three-tier application including a first EPG comprising the first endpoints, a second EPG comprising the second endpoints, and a third EPG comprising the third endpoints.

The presentation module 112 can include an application programming interface (API) or command line interface (CLI) 160, a security information and event management (SIEM) interface 162, and a web front-end 164. As the analytics engine 110 processes network traffic and corresponding data and generates analytics data, the analytics data may not be in a human-readable form or it may be too voluminous for a user to navigate. The presentation module 112 can take the analytics data generated by analytics engine 110 and further summarize, filter, and organize the analytics data as well as create intuitive presentations for the analytics data.

In some embodiments, the API or CLI 160 can be implemented using Hadoop® Hive from Apache® for the back end, and Java® Database Connectivity (JDBC) from Oracle® Corporation of Redwood Shores, Calif., as an API layer. Hive is a data warehouse infrastructure that provides data summarization and ad hoc querying. Hive provides a mechanism to query data using a variation of structured query language (SQL) that is called HiveQL. JDBC is an application programming interface (API) for the programming language Java®, which defines how a client may access a database.

In some embodiments, the SIEM interface 162 can be implemented using Kafka for the back end, and software provided by Splunk®, Inc. of San Francisco, Calif. as the SIEM platform. Kafka is a distributed messaging system that is partitioned and replicated. Kafka uses the concept of topics. Topics are feeds of messages in specific categories. In some embodiments, Kafka can take raw packet captures and telemetry information from the data mover 108 as input, and output messages to a SIEM platform, such as Splunk®. The Splunk® platform is utilized for searching, monitoring, and analyzing machine-generated data.

In some embodiments, the web front-end 164 can be implemented using software provided by MongoDB®, Inc. of New York, N.Y. and Hadoop® ElasticSearch from Apache® for the back-end, and Ruby on Rails™ as the web application framework. MongoDB® is a document-oriented NoSQL database based on documents in the form of JavaScript® Object Notation (JSON) with dynamic schemas. ElasticSearch is a scalable and real-time search and analytics engine that provides domain-specific language (DSL) full querying based on JSON. Ruby on Rails™ is model-view-controller (MVC) framework that provides default structures for a database, a web service, and web pages. Ruby on Rails™ relies on web standards such as JSON or extensible markup language (XML) for data transfer, and hypertext markup language (HTML), cascading style sheets, (CSS), and JavaScript® for display and user interfacing.

Although FIG. 1 illustrates an example configuration of the various components of a network traffic monitoring system, those of skill in the art will understand that the components of the network traffic monitoring system 100 or any system described herein can be configured in a number of different ways and can include any other type and number of components. For example, the sensors 104, the collectors 106, the data mover 108, and the data lake 130 can belong to one hardware and/or software module or multiple separate modules. Other modules can also be combined into fewer components and/or further divided into more components.

Figure 2:
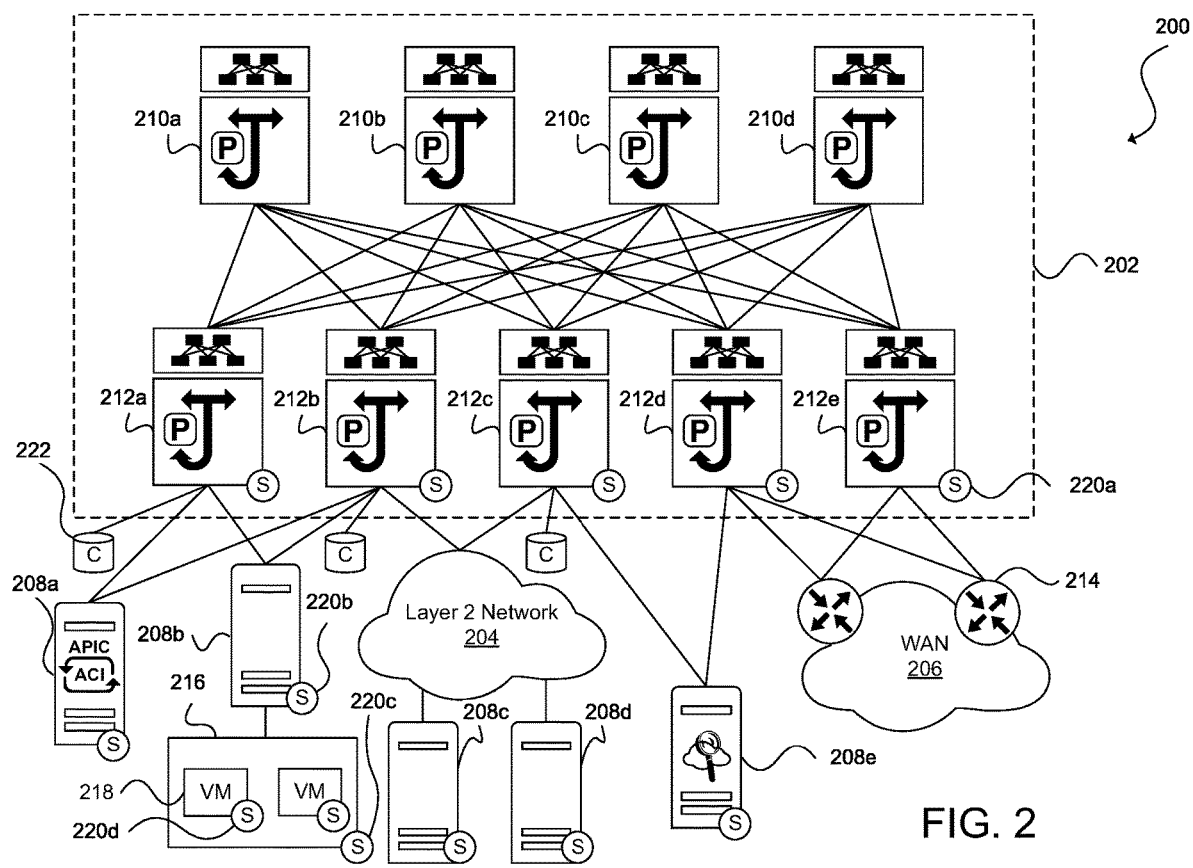
FIG. 2 illustrates an example of a network environment, in accordance with an embodiment.

FIG. 2 illustrates an example of a network environment 200 in accordance with an embodiment. In some embodiments, a network traffic monitoring system, such as the network traffic monitoring system 100 of FIG. 1, can be implemented in the network environment 200. It should be understood that, for the network environment 200 and any environment discussed herein, there can be additional or fewer nodes, devices, links, networks, or components in similar or alternative configurations. Embodiments with different numbers and/or types of clients, networks, nodes, cloud components, servers, software components, devices, virtual or physical resources, configurations, topologies, services, appliances, deployments, or network devices are also contemplated herein. Further, the network environment 200 can include any number or type of resources, which can be accessed and utilized by clients or tenants. The illustrations and examples provided herein are for clarity and simplicity.

The network environment 200 can include a network fabric 202, a Layer 2 (L2) network 204, a Layer 3 (L3) network 206, and servers 208a, 208b, 208c, 208d, and 208e (collectively, 208). The network fabric 202 can include spine switches 210a, 210b, 210c, and 210d (collectively, "210") and leaf switches 212a, 212b, 212c, 212d, and 212e (collectively, "212"). The spine switches 210 can connect to the leaf switches 212 in the network fabric 202. The leaf switches 212 can include access ports (or non-fabric ports) and fabric ports. The fabric ports can provide uplinks to the spine switches 210, while the access ports can provide connectivity to endpoints (e.g., the servers 208), internal networks (e.g., the L2 network 204), or external networks (e.g., the L3 network 206).

The leaf switches 212 can reside at the edge of the network fabric 202, and can thus represent the physical network edge. For instance, in some embodiments, the leaf switches 212d and 212e operate as border leaf switches in communication with edge devices 214 located in the external network 206. The border leaf switches 212d and 212e may be used to connect any type of external network device, service (e.g., firewall, deep packet inspector, traffic monitor, load balancer, etc.), or network (e.g., the L3 network 206) to the fabric 202.

Although the network fabric 202 is illustrated and described herein as an example leaf-spine architecture, one of ordinary skill in the art will readily recognize that various embodiments can be implemented based on any network topology, including any data center or cloud network fabric. Indeed, other architectures, designs, infrastructures, and variations are contemplated herein. For example, the principles disclosed herein are applicable to topologies including three-tier (including core, aggregation, and access levels), fat tree, mesh, bus, hub and spoke, etc. Thus, in some embodiments, the leaf switches 212 can be top-of-rack switches configured according to a top-of-rack architecture. In other embodiments, the leaf switches 212 can be aggregation switches in any particular topology, such as end-of-row or middle-of-row topologies. In some embodiments, the leaf switches 212 can also be implemented using aggregation switches.

Moreover, the topology illustrated in FIG. 2 and described herein is readily scalable and may accommodate a large number of components, as well as more complicated arrangements and configurations. For example, the network may include any number of fabrics 202, which may be geographically dispersed or located in the same geographic area. Thus, network nodes may be used in any suitable network topology, which may include any number of servers, virtual machines or containers, switches, routers, appliances, controllers, gateways, or other nodes interconnected to form a large and complex network. Nodes may be coupled to other nodes or networks through one or more interfaces employing any suitable wired or wireless connection, which provides a viable pathway for electronic communications.

Network communications in the network fabric 202 can flow through the leaf switches 212. In some embodiments, the leaf switches 212 can provide endpoints (e.g., the servers 208), internal networks (e.g., the L2 network 204), or external networks (e.g., the L3 network 206) access to the network fabric 202, and can connect the leaf switches 212 to each other. In some embodiments, the leaf switches 212 can connect endpoint groups (EPGs) to the network fabric 202, internal networks (e.g., the L2 network 204), and/or any external networks (e.g., the L3 network 206). EPGs are groupings of applications, or application components, and tiers for implementing forwarding and policy logic. EPGs can allow for separation of network policy, security, and forwarding from addressing by using logical application boundaries. EPGs can be used in the network environment 200 for mapping applications in the network. For example, EPGs can comprise a grouping of endpoints in the network indicating connectivity and policy for applications.

As discussed, the servers 208 can connect to the network fabric 202 via the leaf switches 212. For example, the servers 208*a* and 208*b* can connect directly to the leaf switches 212*a* and 212*b*, which can connect the servers 208*a* and 208*b* to the network fabric 202 and/or any of the other leaf switches. The servers 208*c* and 208*d* can connect to the leaf switches 212*b* and 212*c* via the L2 network 204. The servers 208*c* and 208*d* and the L2 network 204 make up a local area network (LAN). LANs can connect nodes over dedicated private communications links located in the same general physical location, such as a building or campus.

The WAN 206 can connect to the leaf switches 212*d* or 212*e* via the L3 network 206. WANs can connect geographically dispersed nodes over long-distance communications links, such as common carrier telephone lines, optical light paths, synchronous optical networks (SONET), or synchronous digital hierarchy (SDH) links. LANs and WANs can include L2 and/or L3 networks and endpoints.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective size of each network. The endpoints 208 can include any communication device or component, such as a computer, server, blade, hypervisor, virtual machine, container, process (e.g., running on a virtual machine), switch, router, gateway, host, device, external network, etc.

In some embodiments, the network environment 200 also includes a network controller running on the host 208*a*. The network controller is implemented using the Application Policy Infrastructure Controller (APIC™) from Cisco®. The APIC™ provides a centralized point of automation and management, policy programming, application deployment, and health monitoring for the fabric 202. In some embodiments, the APIC™ is operated as a replicated synchronized clustered controller. In other embodiments, other configurations or software-defined networking (SDN) platforms can be utilized for managing the fabric 202.

In some embodiments, a physical server 208 may have instantiated thereon a hypervisor 216 for creating and running one or more virtual switches (not shown) and one or more virtual machines 218, as shown for the host 208*b*. In other embodiments, physical servers may run a shared kernel for hosting containers. In yet other embodiments, the physical server 208 can run other software for supporting other virtual partitioning approaches. Networks in accordance with various embodiments may include any number of physical servers hosting any number of virtual machines, containers, or other virtual partitions. Hosts may also comprise blade/physical servers without virtual machines, containers, or other virtual partitions, such as the servers 208*a*, 208*c*, 208*d*, and 208*e*.

The network environment 200 can also integrate a network traffic monitoring system, such as the network traffic monitoring system 100 shown in FIG. 1. For example, the network traffic monitoring system of FIG. 2 includes sensors 220*a*, 220*b*, 220*c*, and 220*d* (collectively, "220"), collectors 222, and an analytics engine, such as the analytics engine 110 of FIG. 1, executing on the server 208*e*. The analytics engine 208*e* can receive and process network traffic data collected by the collectors 222 and detected by the sensors 220 placed on nodes located throughout the network environment 200. Although the analytics engine 208*e* is shown to be a standalone network appliance in FIG. 2, it will be appreciated that the analytics engine 208*e* can also be implemented as a virtual partition (e.g., VM or container) that can be distributed onto a host or cluster of hosts, software as a service (SaaS), or other suitable method of distribution. In some embodiments, the sensors 220 run on the leaf switches 212 (e.g., the sensor 220*a*), the hosts 208 (e.g., the sensor 220*b*), the hypervisor 216 (e.g., the sensor 220*c*), and the VMs 218 (e.g., the sensor 220*d*). In other embodiments, the sensors 220 can also run on the spine switches 210, virtual switches, service appliances (e.g., firewall, deep packet inspector, traffic monitor, load balancer, etc.) and in between network elements. In some embodiments, sensors 220 can be located at each (or nearly every) network component to capture granular packet statistics and data at each hop of data transmission. In other embodiments, the sensors 220 may not be installed in all components or portions of the network (e.g., shared hosting environment in which customers have exclusive control of some virtual machines).

As shown in FIG. 2, a host may include multiple sensors 220 running on the host (e.g., the host sensor 220*b*) and various components of the host (e.g., the hypervisor sensor 220c and the VM sensor 220d) so that all (or substantially all) packets traversing the network environment 200 may be monitored. For example, if one of the VMs 218 running on the host 208b receives a first packet from the WAN 206, the first packet may pass through the border leaf switch 212d, the spine switch 210b, the leaf switch 212b, the host 208b, the hypervisor 216, and the VM. Since all or nearly all of these components contain a respective sensor, the first packet will likely be identified and reported to one of the collectors 222. As another example, if a second packet is transmitted from one of the VMs 218 running on the host 208b to the host 208d, sensors installed along the data path, such as at the VM 218, the hypervisor 216, the host 208b, the leaf switch 212b, and the host 208d will likely result in capture of metadata from the second packet.

Figure 3:
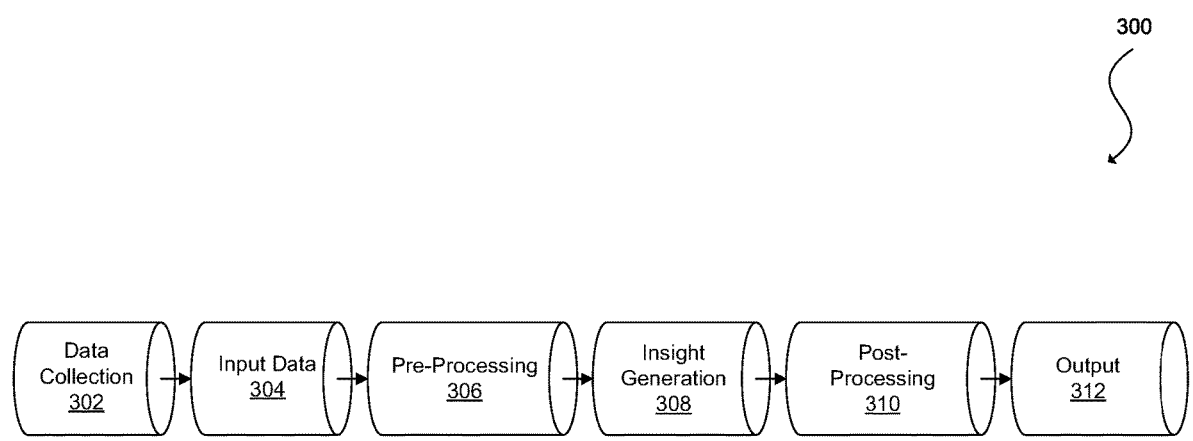
FIG. 3 illustrates an example of a data pipeline for generating network insights based on collected network information, in accordance with an embodiment.

FIG. 3 illustrates an example of a data pipeline 300 for generating network insights based on collected network information. The insights generated may include, for example, discovered applications or inventories, application dependencies, policies, efficiencies, resource and bandwidth usage, and network flows can be determined for the network using the network traffic data. In some embodiments, the data pipeline 300 can be directed by a network traffic monitoring system, such as the network traffic monitoring system 100 of FIG. 1; an analytics engine, such as the analytics engine 110 of FIG. 1; or other network service or network appliance. For example, an analytics engine 110 can be configured to discover of applications running in the network, map the applications' interdependencies, generate a set of proposed network policies for implementation, and monitor policy conformance and non-conformance among other network-related tasks.

The data pipeline 300 includes a data collection stage 302 in which network traffic data and corresponding data (e.g., host data, process data, user data, etc.) are captured by sensors (e.g., the sensors 104 of FIG. 1) located throughout the network. The data may comprise, for example, raw flow data and raw process data. As discussed, the data can be captured from multiple perspectives to provide a comprehensive view of the network. The data collected may also include other types of information, such as tenant information, virtual partition information, out-of-band information, third party information, and other relevant information. In some embodiments, the flow data and associated data can be aggregated and summarized daily or according to another suitable increment of time, and flow vectors, process vectors, host vectors, and other feature vectors can be calculated during the data collection stage 302. This can substantially reduce processing.

The data pipeline 300 may also include an input data stage 304 in which a network or security administrator or other authorized user may configure insight generation by selecting the date range of the flow data and associated data to analyze, and those nodes for which the administrator wants to analyze. In some embodiments, the administrator can also input side information, such as server load balance, route tags, and previously identified clusters during the input data stage 304. In other embodiments, the side information can be automatically pulled or another network element can push the side information.

The next stage of the data pipeline 300 is pre-processing 306. During the pre-processing stage 306, nodes of the network are partitioned into selected node and dependency node subnets. Selected nodes are those nodes for which the user requests application dependency maps and cluster information. Dependency nodes are those nodes that are not explicitly selected by the users for an ADM run but are nodes that communicate with the selected nodes. To obtain the partitioning information, edges of an application dependency map (i.e., flow data) and unprocessed feature vectors can be analyzed.

Other tasks can also be performed during the pre-processing stage 306, including identifying dependencies of the selected nodes and the dependency nodes; replacing the dependency nodes with tags based on the dependency nodes' subnet names; extracting feature vectors for the selected nodes, such as by aggregating daily vectors across multiple days, calculating term frequency-inverse document frequency (tf-idf), and normalizing the vectors (e.g., $\ell_2$ normalization); and identifying existing clusters.

In some embodiments, the pre-processing stage 306 can include early feature fusion pre-processing. Early fusion is a fusion scheme in which features are combined into a single representation. Features may be derived from various domains (e.g., network, host, virtual partition, process, user, etc.), and a feature vector in an early fusion system may represent the concatenation of disparate feature types or domains.

Early fusion may be effective for features that are similar or have a similar structure (e.g., fields of TCP and UDP packets or flows). Such features may be characterized as being a same type or being within a same domain. Early fusion may be less effective for distant features or features of different types or domains (e.g., flow-based features versus process-based features). Thus, in some embodiments, only features in the network domain (i.e., network traffic-based features, such as packet header information, number of packets for a flow, number of bytes for a flow, and similar data) may be analyzed. In other embodiments, analysis may be limited to features in the process domain (i.e., process-based features, such as process name, parent process, process owner, etc.). In yet other embodiments, feature sets in other domains (e.g., the host domain, virtual partition domain, user domain, etc.) may be the.

After pre-processing, the data pipeline 300 may proceed to an insight generation stage 308. During the insight generation stage 308, the data collected and inputted into the data pipeline 300 may be used to generate various network insights. For example, an analytics engine 110 can be configured to discover of applications running in the network, map the applications' interdependencies, generate a set of proposed network policies for implementation, and monitor policy conformance and non-conformance among other network-related tasks. Various machine learning techniques can be implemented to analyze feature vectors within a single domain or across different domains to generate insights. Machine learning is an area of computer science in which the goal is to develop models using example observations (i.e., training data), that can be used to make predictions on new observations. The models or logic are not based on theory but are empirically based or data-driven.

After clusters are identified, the data pipeline 300 can include a post-processing stage 310. The post-processing stage 310 can include tasks such as filtering insight data, converting the insight data into a consumable format, or any other preparations needed to prepare the insight data for consumption by an end user. At the output stage 312, the generated insights may be provided to an end user. The end user may be, for example a network administrator, a third-party computing system, a computing system in the network, or any other entity configured to receive the insight data. In some cases, the insight data may be configured to be displayed on a screen or provided to a system for further processing, consumption, or storage.

As noted above, a network traffic monitoring system may be configured to continually collect network data and generate various insights based on the collected network data. This network data and the insights may be updated over time and each set of network data and/or insights may provide a network snapshot or view of the state of the network for a particular period of time. The network snapshot may be generated periodically over time or in response to one or more events. Events may include, for example, a change to a network policy or configuration; an application experiencing latency that exceeds an application latency threshold; the network experiencing latency that exceeds a network latency threshold; failure of server, network device, or other network element; and similar circumstances. Various network snapshots may further be compared in order to identify changes in the state of the network over time and be used to provide additional insights into the operations of the network.

However, each network snapshot for an entire network or network cluster, may be quite large in size. The network may include a large number of nodes and a sensor may be implemented on some or all of the nodes in the network. Nodes may include, for example, a virtual partition (e.g., VM or container); a hypervisor or shared kernel managing one or more virtual partitions and/or physical servers, an application-specific integrated circuit (ASIC) of a switch, router, gateway, or other networking device, or a packet capture (pcap) appliance (e.g., a standalone packet monitor, a device connected to a network devices monitoring port, a device connected in series along a main trunk of a datacenter, or similar device), servers, end-user devices, or other element of a network. The amount of data generated by these sensors and the insights that may be derived from the data may be quite large. Furthermore, the network state may be updated often, causing several network snapshots to be created and created often.

There are many technical limitations to transmitting and receiving that amount of data often enough for end users to stay in sync, especially when multiple network snapshots are generated in relatively quick succession. Additionally, in some cases, the network snapshots may be requested by a large number of end users or consumers of the network snapshots. Communication of such large amounts of data to multiple entities may be difficult for the network traffic monitoring system to transmit and difficult for each entity to receive, especially when the network traffic monitoring system and/or each receiving entity may crash or deal with transmission errors. Aspects of the subject technology address these technical problems by fragmenting each network snapshot into smaller chunks or segments and using a stream processing service to publish the network snapshots to one or more subscribers.

Figure 4:
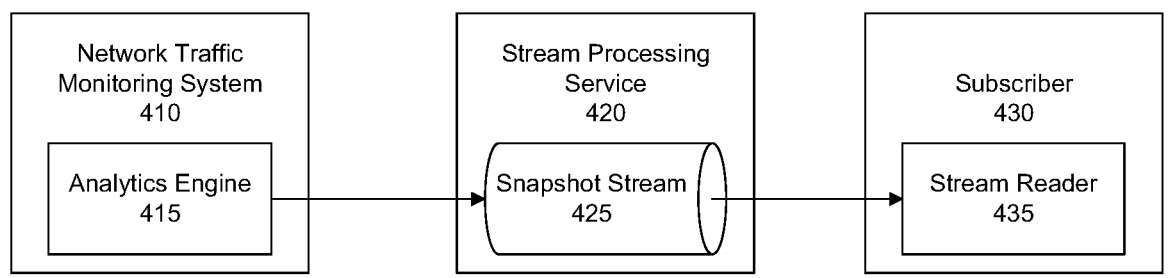
FIG. 4 illustrates an example of a network traffic monitoring system providing network snapshots to subscribers, in accordance with an embodiment.

FIG. 4 illustrates an example of a network traffic monitoring system 410 providing network snapshots to subscribers 430, in accordance various embodiments. An analytics engine 415 of a network monitoring system 410 may be configured to collect the network data generated by sensors deployed in a network, derive insights based on the network data, and generate network snapshots based on the network data and/or insights. The network snapshots may be generated periodically over time (e.g., every 15 minutes) and/or in response to network changes or events. Each network snapshot that is generated by the analytics engine 415 may be quite large in size. Accordingly, the analytics engine 415 may be configured to partition a network snapshot into smaller network snapshot segments (e.g., a 10 megabyte segment) and transmit the network snapshot segments to a stream processing service 420.

According to some embodiment, the stream processing service 420 may be implemented in the network traffic monitoring system 410, as part of the analytics engine 415, or in the network managed by the network traffic monitoring system 410. In other embodiments, however, the stream processing service 420 may be outside of the network managed by the network traffic monitoring system 410. The stream processing service 420 is configured to receive network snapshots or network snapshot segments from the analytics engine 415 and publish the network snapshot segments to one or more subscribers via a snapshot stream 425.

According to other embodiments, the analytics engine 415 may provide the network snapshots to the stream processing service 420 and the stream processing service 420 may partition each snapshot into smaller network snapshot segments for the snapshot stream 425.

A subscriber 430 may be a device, application, or other entity that can make use of the network snapshots provided by the analytics engine 415. For example, the subscriber 430 may use the network snapshots to update network policies, generate additional insights, or store for analysis. The stream reader 435 may be a component of the subscriber 430 that subscribes to the snapshot stream 425 of the stream processing service 420. The stream reader 435 is further configured to receive messages from the stream processing service 420 that include one or more network snapshot segments and reconstruct the network snapshot based on the received network snapshot segments. The reconstruction of a network snapshot faces additional technical obstacles in cases where subscribers 430 start receiving network snapshot segments in the middle of a network snapshot or the sequence of network snapshot segments that are received is broken.

Various embodiments of the subject technology address these and other technical obstacles by having the analytics engine 415 annotate or tag each network snapshot segment with metadata that may be used by the stream reader 435 to reconstruct a network snapshot. The metadata may include, for example a "start" label, an "end" label, and/or a number associated with the location of the network snapshot segment within the network snapshot. For example, a first segment of a network snapshot may be tagged with the "start" label and a last segment of the network snapshot may be tagged with the "end" label. Each segment of a snapshot may also be numbered (e.g., from 0 to n, where n is assigned to the last segment). The network segments of the network snapshot are then provided to the stream processing service 420 for distribution in a snapshot output stream 425.

Once the stream reader 435 subscribes to the snapshot stream 425 or otherwise begins receiving stream messages from the stream processing service 420, the stream reader 435 may use the tags (e.g., start/end tags) and/or the enumeration of a received network snapshot segment to determine which network snapshot segment has been received and which network snapshot segments, if any, should be requested from the stream processing service. For example, if the first network snapshot segment received by the stream reader 435 is segment 5, the stream reader 435 may transmit requests for segments 0-4 from the stream processing service 420 or request transmission of the stream starting from 5 segments back from the recently received network snapshot segment (e.g., rewinding the stream). Once a network snapshot segment tagged with the "end" label is received, the stream reader 435 may compile the network snapshot segments into a network snapshot.

Figure 5:
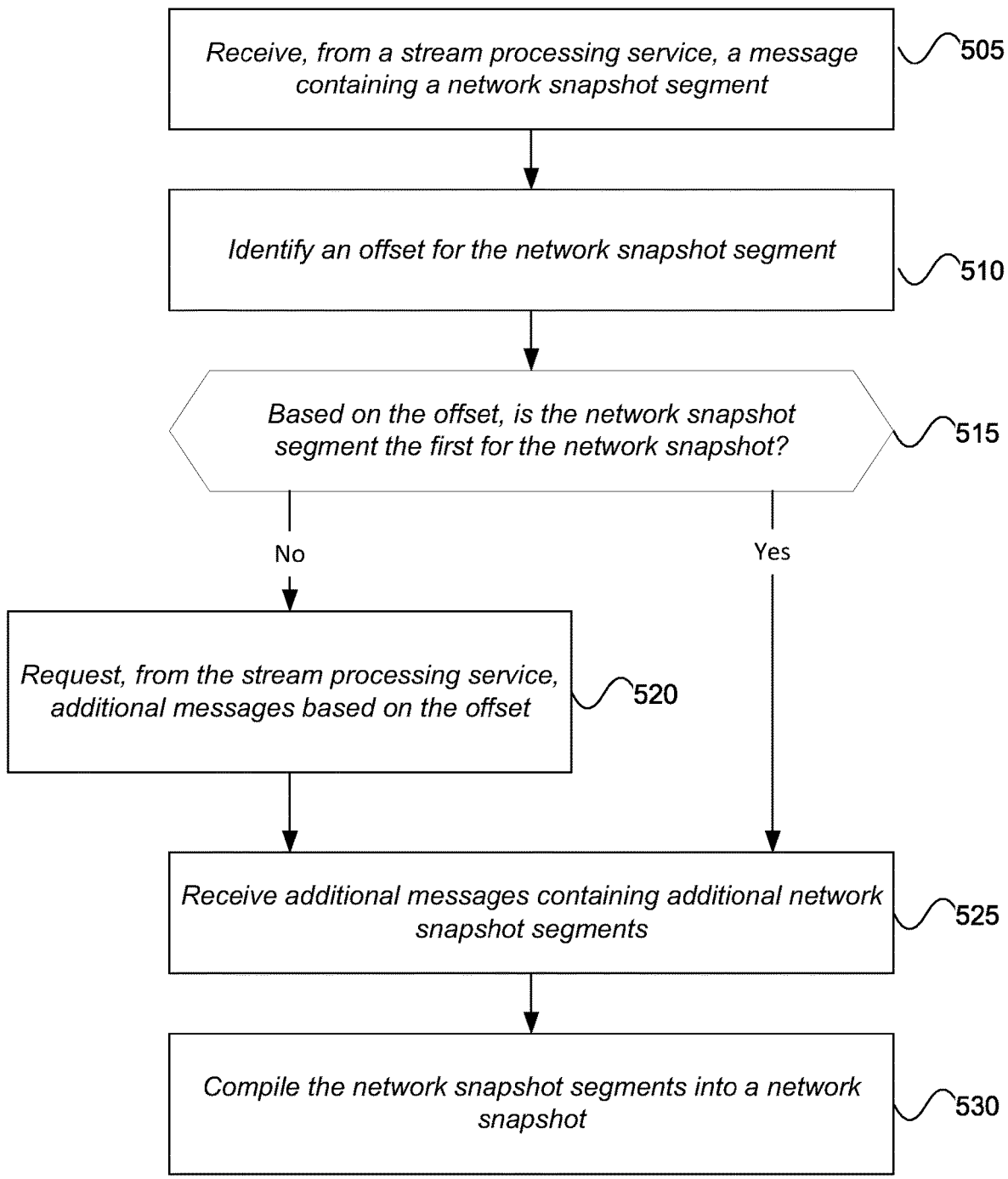
FIG. 5 illustrates an example of a process for compiling a network snapshot, in accordance with an embodiment.

FIG. 5 illustrates an example of a process 500 for compiling a network snapshot, in accordance with an embodiment. It should be understood that, for any process discussed herein, there can be additional, fewer, or alternative steps performed in similar or alternative orders, or in parallel, within the scope of the various embodiments unless otherwise stated. The process 500 can be performed by a computing device, and particularly, a subscriber device (e.g., the subscriber 430 of FIG. 4), a stream reader application (e.g., the stream reader 435 of FIG. 4), or similar system.

The subscriber device may subscribe to a snapshot stream provided by a stream processing service. The stream processing service may be configured to publish network snapshot segments to potentially a large number of subscribers. The network snapshot segments may be provided to subscribers in a series of messages that each include a network snapshot segment and metadata for the network snapshot segment (e.g., labels, tags, enumerations, segment identifiers, network snapshot identifiers, etc.) that may be used to indicate a position of the network snapshot segment within the snapshot stream.

Once the subscriber device is subscribed to the snapshot stream, at operation 505, the subscriber device may receive a message containing a network snapshot segment from a stream processing service. Based on the metadata also contained in the message, the subscriber device may identify an offset associated with the network snapshot segment received in the message at operation 510. Based on the offset, the subscriber device may determine whether the network snapshot segment is the first segment for the network snapshot or whether additional network snapshot segments should be requested at operation 515.

For example, if the metadata for the network snapshot segment contains a "start" label or a "0" for the enumerated snapshot offset identifier, the subscriber device may determine that the offset for the network snapshot segment is 0, indicating that the network snapshot segment received in the message is the first network snapshot segment for a network snapshot. Accordingly, the subscriber device has not missed any network snapshot segments for the current network snapshot. The subscriber device can continue to operation 525 and receive subsequent network snapshot segments for the network snapshot from the snapshot stream and compile the network snapshot without having to request other network snapshot segments that the subscriber device has missed.

If, on the other hand, the metadata for the network snapshot segment does not contain the "start" label or the "0" value for the enumerated snapshot segment offset identifier, the subscriber device may determine that the network snapshot segment received in the message is not the first network snapshot segment for the network snapshot. If the subscriber device has not received the previous network snapshot segments for the network snapshot, the subscriber device may request additional messages containing the previous network snapshot segments from the stream processing service at operation 520.

There may be several reasons for the subscriber device not having received one or more of the previous network snapshot segments. For example, the subscriber device may have just subscribed to the snapshot stream and the network snapshot segment received at operation 505 may be the first segment received for the network snapshot. The subscriber device or the stream reader associated with the subscriber device may have just restarted operation or one or more of the previous snapshot segments may not have been transmitted properly based on network failures, interface failures, or errors by the subscriber device or the stream processing service.

As an illustrative example, the metadata for the network snapshot segment may contain a snapshot offset identifier value of "8." The subscriber device may determine that the offset for the network snapshot segment is 8, indicating that there are 8 previous network snapshot segments (e.g., network snapshot segments with offset identifier values 0-7) for the current network snapshot before the current network snapshot. If the subscriber device has not received these previous network snapshot segments, the subscriber device may request them from the stream processing service at operation 520. These network stream segments may be provided out-of-stream. That is, the stream processing service may provide them separately to the subscriber device upon request, outside the normal sequential operation of the snapshot stream.

While the requested network snapshot segments are being sent by the stream processing service and/or after they are received by the subscriber device, the subscriber device can continue receiving additional message from the snapshot stream at operation 525. Once the last network snapshot segment for a network snapshot is received, the subscriber device may compile the network snapshot segments into a network snapshot at operation 530. The subscriber device may identify the last network snapshot segment for the network snapshot because the metadata associated with the network snapshot segment may include an "end" or "last" label.

After the network snapshot segments for a first network snapshot are received and compiled, the subscriber device may continue to receive messages from the snapshot stream containing additional network snapshot segments for subsequent network snapshots. As a result, a series of network snapshots generated by a network traffic monitoring system may be provided to a stream processing service and provided to one or more subscribers in network snapshot segments that may be compiled by the subscriber system. These network snapshots may further processed or analyzed by the subscriber device for further use by the subscriber device or downstream consumers. For example, according to some embodiments, after a network snapshot is compiled, the subscriber device or the stream reader associated with the subscriber device may convert the network snapshot into a generic format that may be consumed by a group of diverse downstream consumers.

As noted above, the network snapshots may represent the state of a network or information associated with the network during a particular time period. Accordingly, multiple network snapshots that are compiled by the subscriber system may be compared in order to identify changes in the state of the network over time and be used to provide additional insights into the operations of the network. The subscriber system may further be configured to compare two or more network snapshots, identify the differences between the network snapshots, and provide the differences to a downstream consumer.

Figure 6:
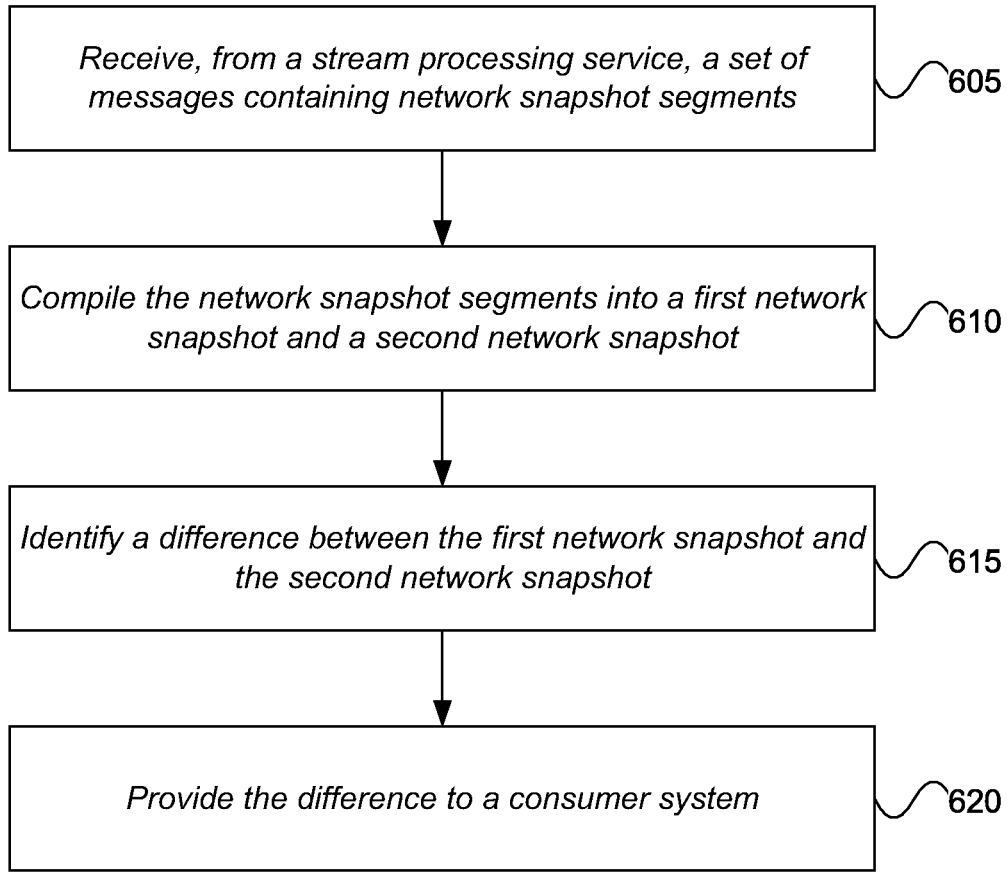
FIG. 6 illustrates an example of a process for identifying a difference between network snapshots, in accordance with an embodiment.

FIG. 6 illustrates an example of a process 600 for identifying a difference between network snapshots, in accordance with an embodiment. It should be understood that, for any process discussed herein, there can be additional, fewer, or alternative steps performed in similar or alternative orders, or in parallel, within the scope of the various embodiments unless otherwise stated. The process 600 can be performed by a computing device, and particularly, a subscriber device (e.g., the subscriber 430 of FIG. 4), a stream reader application (e.g., the stream reader 435 of FIG. 4), or similar system.

At operation 605, a stream reader or similar system may receive from a stream processing system a set of messages that contain network snapshot segments. The messages may be received based on process 500 of FIG. 5 or a similar process. At operation 610, the stream reader may compile the network snapshot segments into two or more network snapshots. For the sake of illustrating the process of FIG. 6, a first network snapshot and a second network snapshot may be compiled.

At operation 615, the stream reader compares the compiled network snapshots to identify a difference between the first network snapshot and the second network snapshot. This difference may represent a change in a network policy or other data associated with the network. At operation 620, the difference may then be provided to one or more consumer systems. In some cases, the difference may be converted into a generic format that is more accessible to the consumer systems. The consumer systems may be downstream consumers of network information and may be configured to use the difference to update network information stored by the consumer system rather than store the entire network snapshot. By using the difference to update the network information rather than an entire network snapshot, network resources (e.g., bandwidth), memory, processing time, and other computing resources may be conserved or more efficiently utilized.

According to some embodiments, downstream consumers systems of the network information may be interested in different portions of the network snapshots. For example, one consumer system may be interested in one set of endpoint groups in the network while another consumer system may be interested in another set of endpoint groups. These two sets of endpoint groups may or may not have overlapping portions. In order to reduce the information provided to the consumer system and further improve the efficient use of computing resources, the stream reader may filter out portions of the network snapshots or the identified differences between network snapshots provided to each consumer system based on filtering criteria associated with each consumer system. The filtering criteria may include, for example, endpoint group identifiers, a list of IP addresses of interest, a list of network policies of interest, or any other criteria that may be used to filter, categorize, or group network information or insights generated by the network traffic monitoring system.

Various embodiments relate to a computer-implemented method comprising receiving a set of messages associated with an output stream of a stream processing service, wherein each message in the set of messages includes a network snapshot segment. The method includes compiling the network snapshot segments from the set of messages into a first network snapshot and a second network snapshot, identifying a difference between the first network snapshot and the second network snapshot, and providing the difference to a consumer system.

The first network snapshot may correspond to a state of a network during a first time period and the second network snapshot may correspond to the state of the network during a second time period. The state of the network may include network policies for the network. The difference between the first network snapshot and the second network snapshot may indicate a change in a state of a network.

The method may further include receiving, from the consumer system, filtering criteria for the first network snapshot and the second network snapshot and filtering the difference between the first network snapshot and the second network snapshot based on the filtering criteria. The method may further include receiving, from the consumer system, filtering criteria for the first network snapshot and the second network snapshot and filtering the first network snapshot and the second network snapshot based on the filtering criteria. The filtering criteria may include a list of IP addresses associated with the consumer system.

The method may further include receiving a first message associated with the output stream, wherein the first message includes a first network snapshot segment and an offset for the first network snapshot segment, determining, based on the offset, that at least one additional network snapshot segment associated with the output stream has not been previously received, and transmit, to the stream processing service, a request for the at least one additional network snapshot segment. The request of the at least one additional network snapshot segment may be for an out-of-stream message outside a sequence of messages associated with the output stream, wherein the out-of-stream message includes the at least one additional network snapshot segment.

Various embodiments relate to a non-transitory computer-readable medium having computer readable instructions that, upon being executed by a processor, cause the processor to receive a set of network snapshot segments from an output stream of a stream processing service, compile the set of network snapshot segments from the output stream into a first network snapshot and a second network snapshot, and compare the first network snapshot and the second network snapshot to identify a difference between the first network snapshot and the second network snapshot.

Additional instructions may cause the processor to provide the difference to a consumer system, receive, from a consumer system, filtering criteria for the first network snapshot and the second network snapshot, or filter the first network snapshot and the second network snapshot based on the filtering criteria. Each network snapshot segment in the set of network snapshot segments may be associated with an offset, and wherein the first network snapshot and the second network snapshot is compiled based on the offsets for each network snapshot segment in the set of network snapshot segments.

Various embodiments relate to a system comprising a processor and memory including instructions that, upon being executed by the processor, cause the system to receive, from a consumer system, filtering criteria for network information generated by a network traffic monitoring system, receive a set of messages associated with an output stream of a stream processing service, wherein each message in the set of messages includes a network snapshot segment, compile the network snapshot segments from the set of messages into a first network snapshot and a second network snapshot, identify a difference between the first network snapshot and the second network snapshot, wherein the difference complies with the filtering criteria, and provide the difference to an end user. The filtering criteria may be a list of IP addresses associated from the consumer system.

Figure 7A:
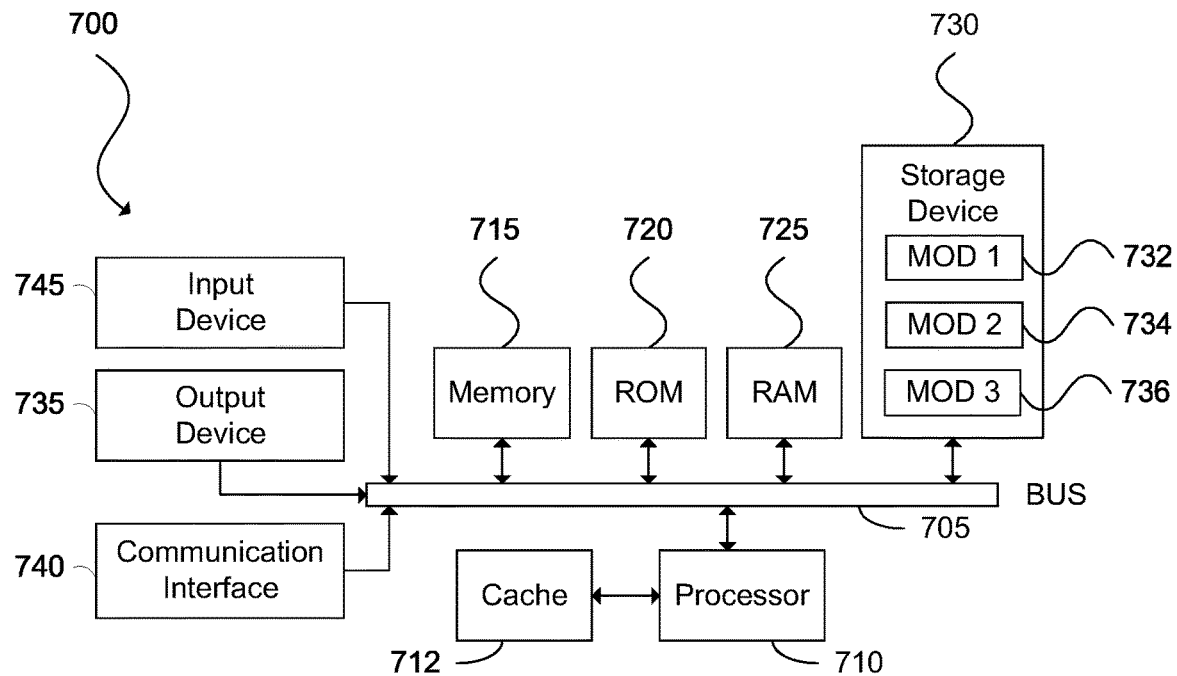
FIGS. 7A and 7B illustrate examples of systems in accordance with some embodiments.
Figure 7B:
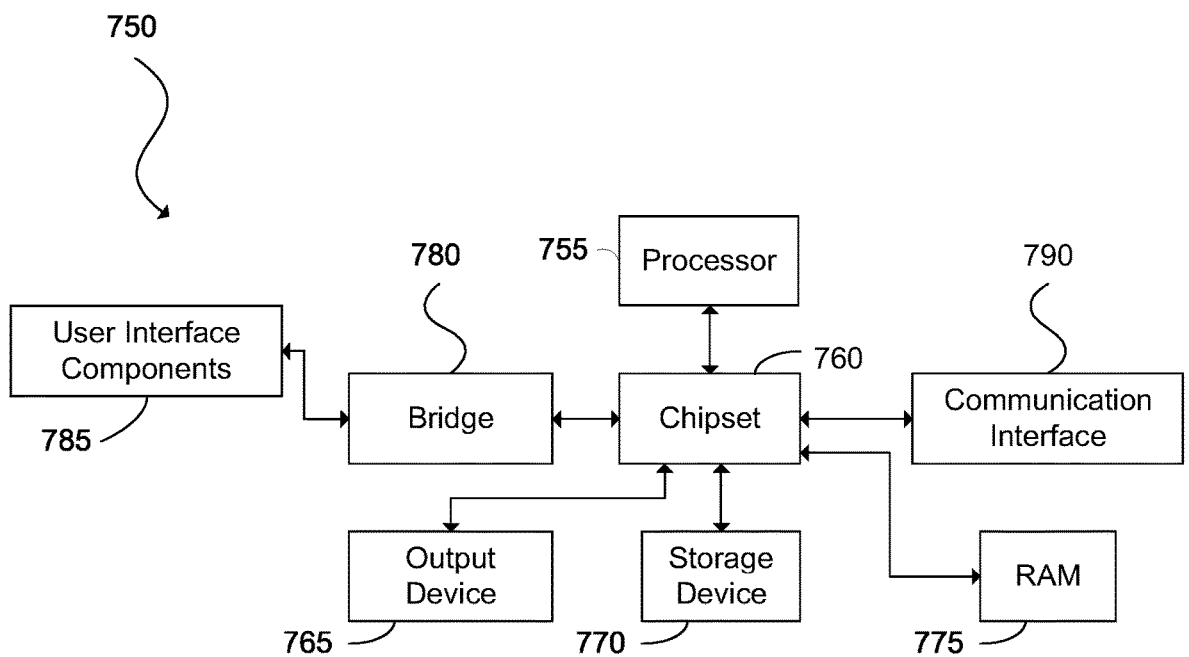

FIG. 7A and FIG. 7B illustrate systems in accordance with various embodiments. The more appropriate system will be apparent to those of ordinary skill in the art when practicing the various embodiments. Persons of ordinary skill in the art will also readily appreciate that other systems are possible.

FIG. 7A illustrates an example architecture for a bus computing system 700 wherein the components of the system are in electrical communication with each other using a bus 705. The computing system 700 can include a processing unit (CPU or processor) 710 and a system bus 705 that may couple various system components including the system memory 715, such as read only memory (ROM) in a storage device 770 and random access memory (RAM) 775, to the processor 710. The computing system 700 can include a cache 712 of high-speed memory connected directly with, in close proximity to, or integrated as part of the processor 710. The computing system 700 can copy data from the memory 715 and/or the storage device 730 to the cache 712 for quick access by the processor 710. In this way, the cache 712 can provide a performance boost that avoids processor delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

Storage device 730 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, output device 735, and so forth, to carry out the function.

FIG. 7B illustrates an example architecture for a chipset computing system 750 that can be used in accordance with an embodiment. The computing system 750 can include a processor 755, representative of any number of physically and/or logically distinct resources capable of executing software, firmware, and hardware configured to perform identified computations. The processor 755 can communicate with a chipset 760 that can control input to and output from the processor 755. In this example, the chipset 760 can output information to an output device 765, such as a display, and can read and write information to storage device 770, which can include magnetic media, and solid state media, for example. The chipset 760 can also read data from and write data to RAM 775. A bridge 780 for interfacing with a variety of user interface components 785 can be provided for interfacing with the chipset 760. The user interface components 785 can include a keyboard, a microphone, touch detection and processing circuitry, a pointing device, such as a mouse, and so on. Inputs to the computing system 750 can come from any of a variety of sources, machine generated and/or human generated.

The chipset 760 can also interface with one or more communication interfaces 790 that can have different physical interfaces. The communication interfaces 790 can include interfaces for wired and wireless LANs, for broadband wireless networks, as well as personal area networks. Some applications of the methods for generating, displaying, and using the GUI disclosed herein can include receiving ordered datasets over the physical interface or be generated by the machine itself by processor 755 analyzing data stored in the storage device 770 or the RAM 775. Further, the computing system 700 can receive inputs from a user via the user interface components 785 and execute appropriate functions, such as browsing functions by interpreting these inputs using the processor 755.

It will be appreciated that computing systems 700 and 750 can have more than one processor 710 and 755, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
receiving a set of messages associated with an output stream of a stream processing service, wherein each message in the set of messages includes a network snapshot segment;
determining, from the set of messages, a message of the set of messages includes an end tag;
based on the end tag, determining that the set of messages includes the network snapshot segments for a first network snapshot and a second network snapshot;
in response to determining the set of messages includes the network snapshot segments for a first network snapshot and a second network snapshot, compiling the network snapshot segments from the set of messages into the first network snapshot and the second network snapshot;
identifying a difference between the first network snapshot and the second network snapshot; and
providing the difference to a consumer system.

2. The computer-implemented method of claim 1, wherein the first network snapshot corresponds to a state of a network during a first time period and the second network snapshot corresponds to the state of the network during a second time period.

3. The computer-implemented method of claim 2, wherein the state of the network comprises network policies for the network.

4. The computer-implemented method of claim 1, wherein the difference between the first network snapshot and the second network snapshot indicates a change in a state of a network.

5. The computer-implemented method of claim 1, further comprising:
receiving, from the consumer system, filtering criteria for the first network snapshot and the second network snapshot; and
filtering the difference between the first network snapshot and the second network snapshot based on the filtering criteria.

6. The computer-implemented method of claim 1, further comprising:

receiving, from the consumer system, filtering criteria for the first network snapshot and the second network snapshot; and
filtering the first network snapshot and the second network snapshot based on the filtering criteria.

7. The computer-implemented method of claim 6, wherein the filtering criteria comprises a list of IP addresses associated with the consumer system.

8. The computer-implemented method of claim 1, further comprising:
receiving a first message associated with the output stream, wherein the first message includes a first network snapshot segment and an offset for the first network snapshot segment;
determining, based on the offset, that at least one additional network snapshot segment associated with the output stream has not been previously received; and
transmit, to the stream processing service, a request for the at least one additional network snapshot segment.

9. The computer-implemented method of claim 8, wherein the request the at least one additional network snapshot segment is for an out-of-stream message outside a sequence of messages associated with the output stream, wherein the out-of-stream message includes the at least one additional network snapshot segment.

10. A non-transitory computer-readable medium having computer readable instructions that, upon being executed by a processor, cause the processor to:
receive a set of network snapshot segments from an output stream of a stream processing service;
determine, from the set of messages, a message of the set of messages includes an end tag;
based on the end tag, determine that the set of messages includes the network snapshot segments for a first network snapshot and a second network snapshot;
in response to the determination that the set of messages includes the network snapshot segments for a first network snapshot and a second network snapshot, compile the set of network snapshot segments from the output stream into the first network snapshot and the second network snapshot; and
compare the first network snapshot and the second network snapshot to identify a difference between the first network snapshot and the second network snapshot.

11. The non-transitory computer-readable medium of claim 10, wherein the instructions, upon being executed by the processor, further cause the processor to provide the difference to a consumer system.

12. The non-transitory computer-readable medium of claim 10, wherein each network snapshot segment in the set of network snapshot segments is associated with an offset, and wherein the first network snapshot and the second network snapshot is compiled based on the offsets for each network snapshot segment in the set of network snapshot segments.

13. The non-transitory computer-readable medium of claim 10, wherein the first network snapshot corresponds to a state of a network during a first time period and the second network snapshot corresponds to the state of the network during a second time period.

14. The non-transitory computer-readable medium of claim 13, wherein the state of the network comprises network policies for the network.

15. The non-transitory computer-readable medium of claim 10, wherein the instructions further cause the processor to:

receive, from a consumer system, filtering criteria for the first network snapshot and the second network snapshot; and filter the first network snapshot and the second network snapshot based on the filtering criteria.

16. A system comprising:

a processor; and memory including instructions that, upon being executed by the processor, cause the system to:

receive, from a consumer system, filtering criteria for network information generated by a network traffic monitoring system;

receive a set of messages associated with an output stream of a stream processing service, wherein each message in the set of messages includes a network snapshot segment;

determine, from the set of messages, a message of the set of messages includes an end tag;

based on the end tag, determine that the set of messages includes the network snapshot segments for a first network snapshot and a second network snapshot;

in response to the determination that the set of messages includes the network snapshot segments for a first network snapshot and a second network snapshot, compile the network snapshot segments from the set of messages into the first network snapshot and the second network snapshot;

identify a difference between the first network snapshot and the second network snapshot, wherein the difference complies with the filtering criteria; and provide the difference to an end usera consumer system.

17. The system of claim 16, comprising further instructions, which when executed causes the system to:

receive, from the consumer system, filtering criteria for network information generated by a network traffic monitoring system, wherein the filtering criteria is a list of IP addresses associated from the consumer system.

18. The system of claim 16, wherein the first network snapshot corresponds to a state of a network during a first time period and the second network snapshot corresponds to the state of the network during a second time period.

19. The system of claim 18, wherein the state of the network comprises network policies for the network.

20. The system of claim 16, wherein the difference between the first network snapshot and the second network snapshot indicates a change in a state of a network.

* * * * *